(12) United States Patent
Neumeier et al.

(10) Patent No.: US 12,445,678 B2
(45) Date of Patent: Oct. 14, 2025

(54) DYNAMIC CONTENT SERVING USING AUTOMATED CONTENT RECOGNITION (ACR) AND DIGITAL MEDIA WATERMARKS

(71) Applicant: INSCAPE DATA, INC., Irvine, CA (US)

(72) Inventors: Zeev Neumeier, Berkeley, CA (US); W. Leo Hoarty, Morgan Hill, CA (US)

(73) Assignee: INSCAPE DATA, INC., Irvine, CA (US)

( * ) Notice: Subject to any disclaimer, the term of this patent is extended or adjusted under 35 U.S.C. 154(b) by 0 days.

(21) Appl. No.: 18/417,822

(22) Filed: Jan. 19, 2024

(65) Prior Publication Data

US 2024/0314389 A1 Sep. 19, 2024

Related U.S. Application Data

(63) Continuation of application No. 16/534,506, filed on Aug. 7, 2019, now Pat. No. 11,917,240.

(60) Provisional application No. 62/718,879, filed on Aug. 14, 2018.

(51) Int. Cl.
| | |
|---|---|
| *H04N 21/44* | (2011.01) |
| *H04N 21/433* | (2011.01) |
| *H04N 21/4363* | (2011.01) |
| *H04N 21/438* | (2011.01) |
| *H04N 21/8358* | (2011.01) |

(52) U.S. Cl.
CPC ... *H04N 21/44016* (2013.01); *H04N 21/4334* (2013.01); *H04N 21/4363* (2013.01); *H04N 21/4383* (2013.01); *H04N 21/8358* (2013.01)

(58) Field of Classification Search
None
See application file for complete search history.

(56) References Cited

U.S. PATENT DOCUMENTS

| | | | |
|---|---|---|---|
| 11,616,992 B2* | 3/2023 | Santangelo | H04L 65/765 370/352 |
| 11,917,240 B2* | 2/2024 | Neumeier | H04N 21/4383 |
| 2009/0327346 A1* | 12/2009 | Teinila | G06Q 30/02 |
| 2014/0282695 A1* | 9/2014 | Bakar | G06Q 30/0241 725/32 |
| 2016/0055606 A1* | 2/2016 | Petrovic | G06V 20/46 382/100 |
| 2017/0070789 A1* | 3/2017 | Liassides | H04N 21/262 |
| 2018/0035149 A1* | 2/2018 | Choi | H04N 21/812 |
| 2018/0035174 A1* | 2/2018 | Littlejohn | H04N 21/6131 |
| 2019/0132652 A1* | 5/2019 | Zhao | H04N 21/8456 |
| 2019/0327526 A1* | 10/2019 | Navin | H04N 21/25891 |
| 2019/0379930 A1* | 12/2019 | Stojancic | H04N 21/43072 |

* cited by examiner

*Primary Examiner* — Ricky Chin
(74) *Attorney, Agent, or Firm* — POLSINELLI LLP

(57) ABSTRACT

Methods, systems, devices, and computer-program products are described herein for providing dynamic content serving. The dynamic content serving technology can identify, in real-time, programming arriving at a client device, identify the specific segment being received, and determine which pre-stored video segment may be used to replace the identified segment. A dynamic content controller component can also identify what devices, in addition to the client device, may also be served with supplemental information either related or unrelated to the program currently displayed on the client device.

20 Claims, 18 Drawing Sheets

Figure 5.1 Illustration of Message Fragmentation (1X System)

DYNAMIC CONTENT SERVING USING AUTOMATED CONTENT RECOGNITION (ACR) AND DIGITAL MEDIA WATERMARKS

CROSS-REFERENCE TO RELATED APPLICATIONS

This application is a continuation of U.S. patent application Ser. No. 16/534,506 filed Aug. 7, 2019, which claims the benefit of U.S. Provisional Application No. 62/718,879, filed Aug. 14, 2018, the entire contents of each which are incorporated herein by reference in their entirety for all purposes.

FIELD

The present application is generally related to implementing dynamic content serving using automated content recognition (ACR) and digital media watermarks.

SUMMARY

Systems and techniques are described herein for implementing dynamic content serving using automated content recognition (ACR) and digital media watermarks. For instance, the dynamic content serving systems and techniques can substitute one video segment stored in a cache memory for another video segment within a video stream in real-time, with high accuracy, and with low latency.

Content substitution for various types of content requires precise timing (e.g., one second or other time period), since additional delay can cause the inserted content to lack visual quality. To achieve the strict timing required to substitute one video signal for another, a video watermark embedded in the program stream can be used as the trigger to initiate certain actions of the dynamic content serving system. In some cases, content that can be used for substitution can be stored locally (e.g., in cache memory) on a client device (e.g., a television, a mobile device, a set-top box, and/or other suitable client device), so that the content can be quickly accessed and used as a substitute for existing content.

With hundreds of television channels carried by a typical video provider (e.g., a Multichannel Video Programming Distributor (MVPD)), there are too many content substitution opportunities for a television to store all substitute content in an internal cache memory (or other local memory of the client device). In some cases, automated content recognition (ACR) can be applied to the dynamic content system to determine the current channel that the client device is displaying, and to instruct the client device to prefetch substitute content via a network (e.g., the Internet). The client device can store (e.g., cache in a local cache) the substitute content locally in the computer memory of the client device.

The client device can detect watermarks in the video stream. For example, a software application operating in the processor memory of the client device (e.g., a smart television or other client device) can be programmed to detect any watermark in a video program that is currently being displayed by the client device. Upon detection of the watermark, the client device can determine a substitute item of content (e.g., a video segment) to pull from its local cache, and can display the substitute item of content in place of the original content that was to be displayed.

In some examples, in the client device that detects a watermark, knowledge of an upcoming video segment substitution can be obtained by monitoring a video stream (e.g., a television channel) upstream of the content distribution to client devices. For example, a server system can monitor the video stream before the video stream is received by client devices for consumption. This monitoring can provide an amount of time (e.g., a few seconds or more) of advanced detection of a video segment of interest, which is enough time to send a command to one or more appropriate client devices to replace an item of content with a substitute item of content.

In some examples, the client device can switch back to the original video stream once the substitute content is finished. For example, control logic can be provided in a dynamic content controller application of the client device to stop displaying substitute content and to switch back to the original programming when the ACR system signals a channel change. The dynamic content controller application in the client device can also be used to serve media content and/or other information to devices on the local area network (referred to as second-screen devices) to which the client device is connected (e.g., devices within a home of an owner of the client device). Content and/or other information sent to second-screen devices can mirror the current content being displayed on the client device, can be related content, and/or can be additional information about the content being displaying on the client device (e.g., an opportunity to purchase a product).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
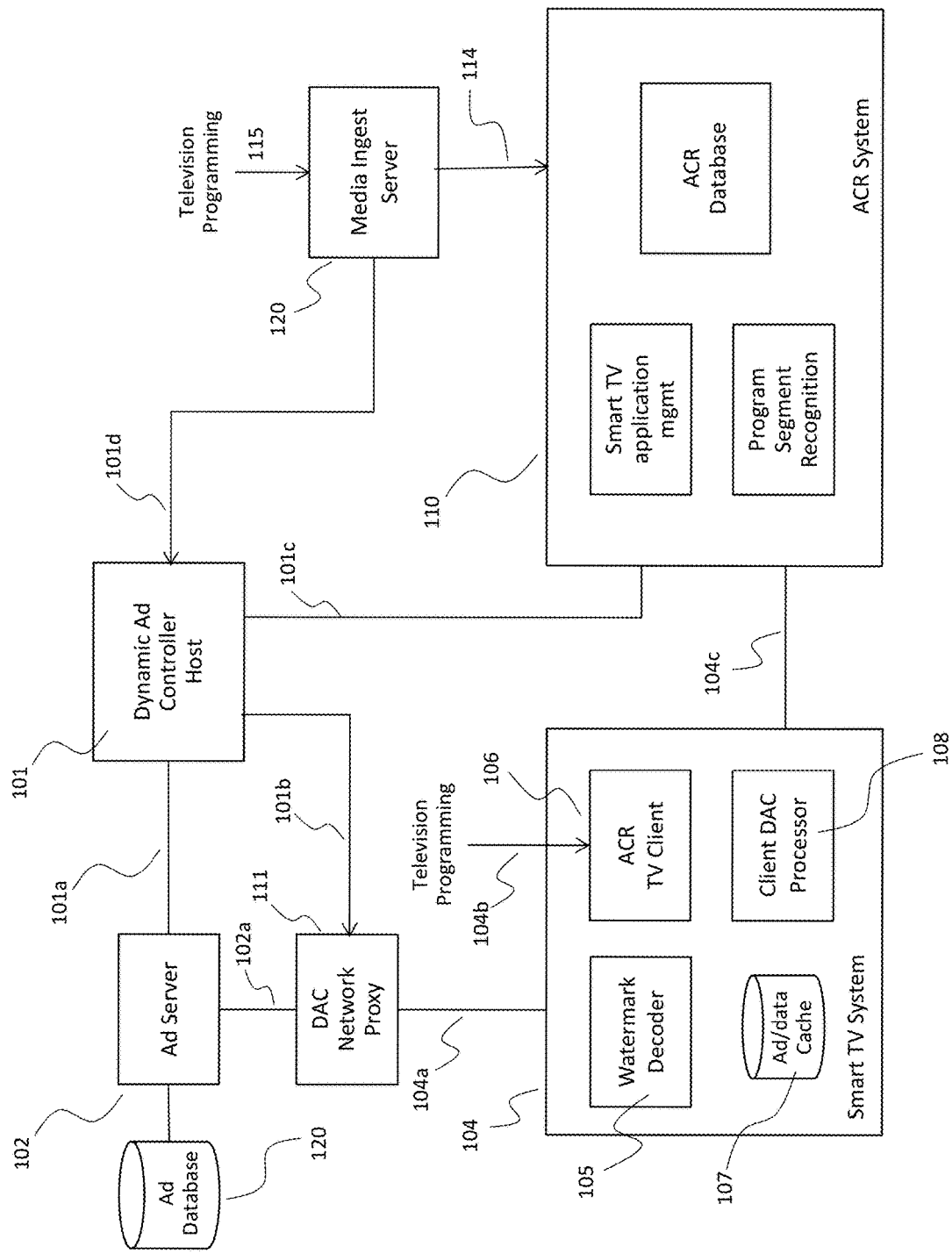
FIG. 1 is a high-level system diagram illustrating an example of a dynamic content serving system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Systems and methods are described herein for implementing dynamic content serving using automated content recognition (ACR) and digital media watermarks. In some cases, the systems and methods can conduct substitution and/or redirection of video segments when triggered by an event. For example, the dynamic content serving systems and methods can substitute one video segment stored in a cache memory for another video segment within a video stream in real-time, with high accuracy, and with low latency. The content substitution action is dynamic, and thus can occur any time a content item (e.g., a video segment) that is eligible to be replaced is detected as currently being displayed by a client device. A video watermark embedded in the program stream can be used as a trigger to initiate certain actions of the dynamic content serving system. In some cases, content that can be used for substitution can be stored locally (e.g., in cache memory) on a client device (e.g., a television, a mobile device, a set-top box, and/or other suitable client device), so that the content can be quickly accessed and used as a substitute for existing content.

Any type of content can be substituted and/or redirected using the techniques described herein. In some examples, the dynamic content serving systems and methods can be used for dynamic advertisement insertion and/or dynamic advertisement re-direction. For instance, the subject matter described herein could include, by way of example and without limitation, substituting the display of a certain television advertisement being broadcast as part of a television program with a different advertisement, such as one that had been predetermined to be more relevant for people in that household. The advertisement substitution action is dynamic; meaning it can occur any time an advertisement that is eligible to be replaced is detected to be currently displayed by means of a process running inside of a client device (e.g., a smart television, a set-top box, a mobile device, a computer, and/or any other suitable client device that can display media content).

The content substitution using the techniques described herein can be used to enhance the content that is provided to viewers. For example, during the early years of television and the growth of advertising-supported programming, the commercial messages displayed on a home television set promoted, by necessity, products or services with a relatively broad appeal. Since all viewers saw the same commercial, companies generally only targeted broad markets that would be likely to be tuned-in during that daypart.

As cable television networks developed, and later became known as "multichannel video programming distributors" (MVPD), the ability to target some advertising on a regional basis, instead of a nationwide basis, enabled advertising for more localized products and services, and attracted attempts to exploit known demographic preferences. For example, advertising dollars spent to promote pickup trucks was believed to be better invested in rural rather than urban marketplaces, while ads featuring compact cars provided to be more effective in urban areas.

By the 1990s, technologies were being developed with the intent to further "cellularize" certain large MVPD systems, enabling the targeting of specific neighborhoods with relevant commercial messages. The relatively recent shift to digital broadcasting of television programing, and the parallel proliferation of more-advanced video distribution methodologies (e.g., digital cable, digital satellite, broadband Internet service, among others), allowed more advanced viewing of media content, such as using smart televisions (televisions), smartphones, tablets, laptops, desktop computers, and other client devices for viewing video programming.

These somewhat dramatic advances in media distribution have created an infrastructure offering an opportunity for the development of novel systems and methods to display content (e.g., alternative video and/or audio content, advertising messages, among other content) on multiple devices and to coordinate messages across devices to the same user and/or other users. Further, new content or messages may be substituted in real-time for the existing content or messages as being more relevant to the interests of a specific individual or household. When advertisements are substituted, the process can be referred to as dynamic advertisement (or ad) substitution. When advertisements are redirected to other devices, the process can be referred to as advertisement (or ad) redirection.

In one illustrative example, dynamic advertisement substitution can be performed by the dynamic content serving system, where a pre-stored advertisement is "spliced" into a video stream in place of an advertisement that was part of the original program stream. In such an example, the viewer of the video stream sees a different advertisement than another viewer viewing the same video stream (e.g., different content than a neighbor sees on their respective television or other viewing device).

The application provides systems and methods that enable a novel technology called dynamic content serving. A dynamic content serving system can include a dynamic content controller. When used for advertisement substitution, the technology can be referred to as Dynamic Advertisement Serving (DAS), which can include a dynamic advertisement controller (DAC). The dynamic content serving system can include a combination of enhanced Automatic Content Recognition (ACR), media watermarking, and other systems working in concert. Such technology identifies video segments (e.g., advertisements) arriving at a display device, identifies the specific video segment being received, and determines in real-time which alternative content (e.g., advertisement message) may be substituted for the original content (e.g., advertisement message). Such dynamic content serving can also identify which devices are connected on a home local area network, in addition to the client device, that may also be served with content (e.g., a targeted message) to be substituted for the originally scheduled content. In some cases, the content can be received or used to provide supplemental information to the other client devices (e.g., a tablet, mobile device, computer, or other device) that is related to a television program on the main client device (e.g., a main television screen).

In some examples, when used for advertisements, the present application addresses an existing need to more tightly target commercial messaging to a specific audience, which can keep television advertising competitive with alternative digital media platforms. Television advertisement substitution requires precise timing of well under one second, since additional delay can cause the inserted advertisements to be visually objectionable. To achieve the tight timing required to substitute one video signal for another, a video watermark embedded in the program stream can be used as the trigger to initiate certain actions of the DAS system.

With hundreds of television channels carried by typical video providers (e.g., MVPDs), there can be too many advertisement substitution opportunities for a television to store all substitute advertisements in an internal memory (e.g., cache memory). Hence, automated content recognition (ACR) can be applied to the DAC system to determine the current channel that the television is displaying and instruct the television to prefetch substitute advertisements via a network (e.g., the Internet) and cache the advertisements locally in the computer memory of the client device.

A software application operating in the processor memory of a client device (e.g., a smart television or other client device) can be programmed to detect any watermark in the video stream (e.g., a television program) currently being displayed by the client device. Upon detection of a watermark, the system can determine a substitute advertisement to be pulled from the local memory (e.g., local cache) and to be displayed in place of the original advertisement currently being displayed.

In some examples, in the client device (e.g., smart television) detecting a watermark, knowledge of an upcoming video segment substitution (e.g., as an advertisement break) can be obtained by monitoring a television channel upstream of the content distribution to homes. For example, a server system can monitor the video stream before the video stream is received by client devices for consumption. Such upstream monitoring can provides a period of time (e.g., a few seconds or other period of time) of advanced detection of a video segment of interest, which provides enough time to send a command to the appropriate client device to replace the content (e.g., an advertisement message). For example, a command from a network controller to an enabled smart television might be as follows: "In 3.4 seconds, replace the advertisement on channel 4 with advertisement number 11 in your local cache," presuming that the replacement advertisement has been successfully prefetched and is already locally stored in the television.

Control logic can be provided in a dynamic content controller application in the client device to stop displaying substitute content (e.g., an advertisement message) and to switch back to the original programming when the ACR system signals a channel change. When used for advertisements, the dynamic controller application can be referred to as a DAC application. This dynamic content controller application in the client device (e.g., smart television) can also be used to serve content (e.g., alternative media content, advertisements, or other information) to devices on the local area network within the home, which are referred to as second-screen devices. Content (e.g., advertisements) sent to second-screen devices can mirror the current content (e.g., an advertisement) displaying on the client device, can be related content (e.g., an advertisement), and/or can be additional information about the content (e.g., an advertisement) being displayed on the client device, such as an opportunity to purchase the product in an advertisement.

In some cases, the dynamic content serving system can produce additional helpful information to determine client device (e.g., television, mobile device, set-top box, or the like) actions, including: (1) knowledge of how long that client device has been continuously tuned to the current channel; (2) type of program currently being viewed; (3) prior viewing habit of the subscriber or the subscriber's home (including all viewers in the subscriber's home), both by day and by daypart; and/or (3) consumer behavioral characteristics collected by the system. This information allows the system to react more responsively to the users' viewing habits and to support the multiple-screen environment that many viewers utilize in these modern times.

As noted above, certain content has strict timing requirements. For example, television advertisement substitution requires precise timing, typically on the order of less than 300 msec, since any additional delay (also known as latency) can be visually objectionable to a typical viewer. A video watermark embedded in program stream where the substitution is to occur is a good trigger mechanism for precise timing of the dynamic content controller (e.g., a DAC) system. To achieve this low latency in the provisioning of advertisement substitution, the substitute content (e.g., candidate video advertisements) can be stored locally, such as in the memory 107 of a smart television system 104 as illustrated in FIG. 1. While a smart television is used herein as one example of a client device, one of ordinary skill will appreciate that any other type of client device can be used, such as a mobile device, a set-top box, a laptop computer, a desktop computer, a wearable device (e.g., a smart watch, or the like) and/or other type of client device.

There may be too many content substitution opportunities for the smart television system 104 to store locally (e.g., in internal cache 107). For example, for a contemporary MVPD system, there can be many advertisement substitution opportunities that could be too numerous for the television system 104 to store in the internal cache 107. To remedy such a limitation, the television system 104 employs an automated content recognition (ACR) system 110, which can advantageously assist the dynamic content control system by determining the current channel or stream to which a client device (e.g., the television system 104 or set-top, mobile device, or other device connected to the television system 104) is tuned. For example, the ACR system 110 can provide useful information to a DAC system (including dynamic advertisement controller (DAC) host 101 and/or DAC network proxy 111) by determining the current channel to which the television system 104 or set-top connected to the television system 104 is tuned. The ACR system 110, the client DAC processor 108, the DAC network proxy 111, and/or the dynamic ACR system 110 can instruct the television system 104 to prefetch substitute content (e.g., advertisements) from the network and then store the substitute content (e.g., advertisements) locally in the television system 104.

In one example using advertisements as substitute content, the client DAC processor 108 can be directed by the DAC host 101 to retrieve advertisement video segments from an appropriate advertisement server 102, which is accessible through a network (e.g., the Internet or other network) either directly or via a DAC network proxy 111. In some cases, the advertisement assets can come from multiple, disparate advertisement servers. Regardless of the number of advertisement servers to be addressed, the DAC network proxy 111 provides a concentration point such that any one server system (e.g., advertisement server system) does not become overwhelmed by potentially many thousands of simultaneous requests. Consumer viewing pattern can generally follow the well-known Parrado curve, also known as the 80/20 law, meaning that 80% of the households will be turned to the same ten television channels and, hence, the DAC clients in these televisions will likely be requesting the same block of substitute advertisements throughout the daypart and especially during primetime viewing (e.g., 8 pm to 11 pm).

The DAC network proxy 111 can consolidate requests for the same content from many individual Client DAC Processors 108 and can make a single request of the advertisement server 102 (or other content server). The DAC network proxy 111 can then distribute the respective content to the many requestors to be stored in the internal cache of the various client devices.

The advertisements that are to be pre-fetched and stored locally are determined by the DAC Host 101 based on knowledge of the content currently being displayed on the television, which is detected by the ACR system 110 by means of matching fingerprints sent from the television system 104 to the ACR system 110. An example matching system that can perform an illustrative ACR technique is described with respect to FIG. 16-FIG. 18.

Figure 9:
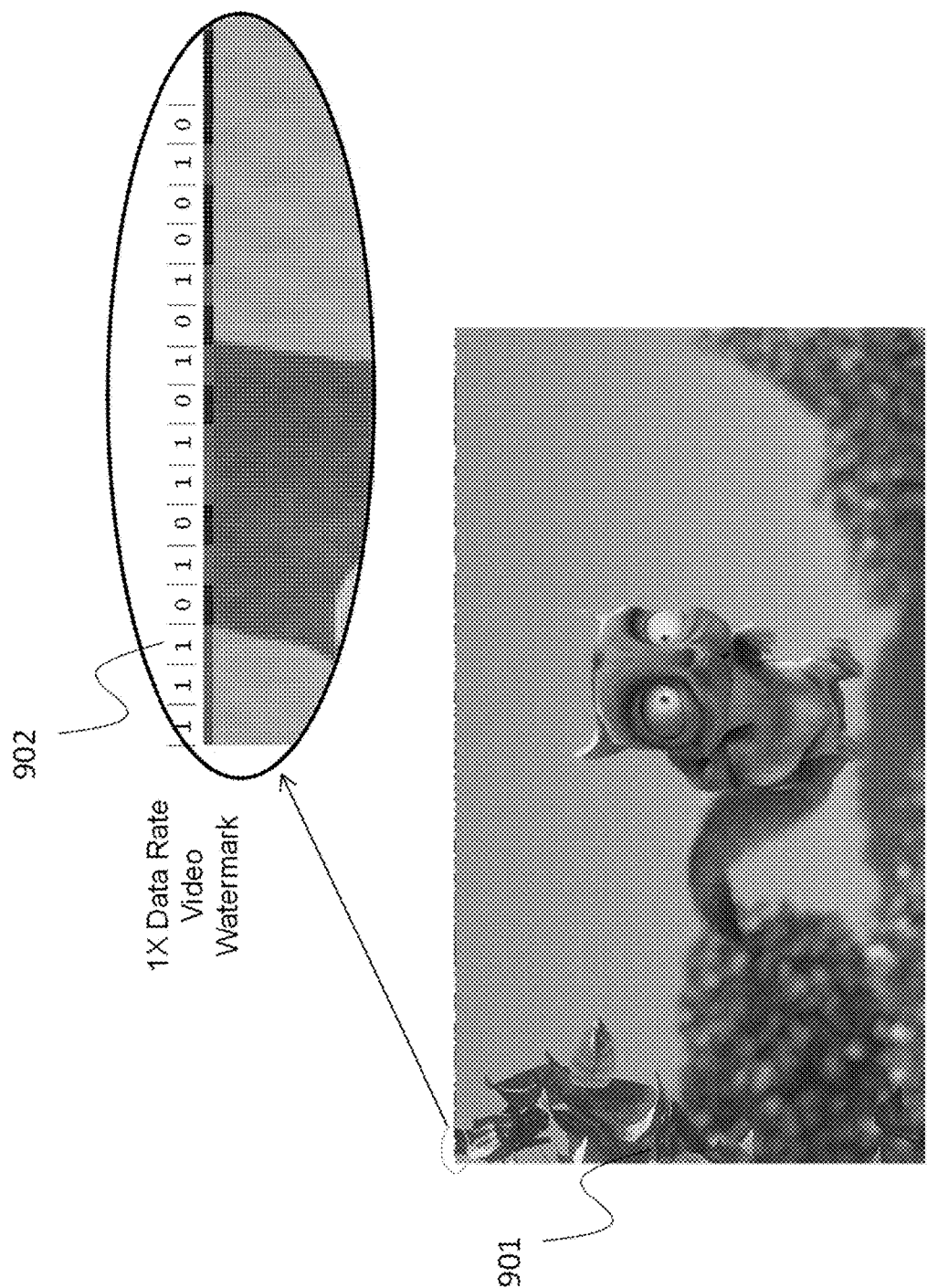
FIG. 9 is a graphic from the ATSC Video Watermark Standard document A335 showing the 1× data-rate video watermark pattern as embedded in a video frame, in accordance with some examples.
Figure 10:
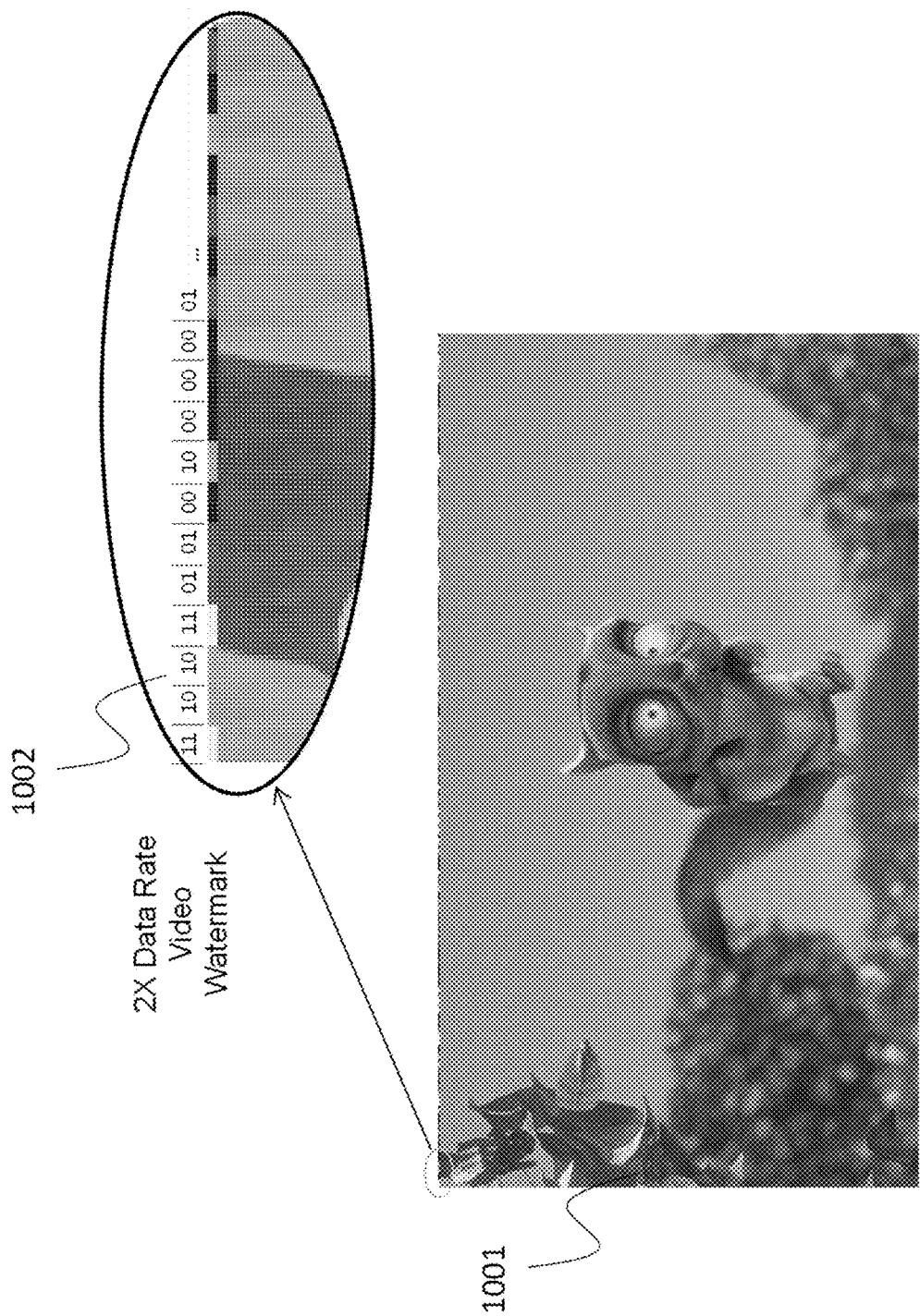
FIG. 10 is a graphic from the ATSC Video Watermark Standard document A335 showing the 2× data-rate video watermark pattern, in accordance with some examples.
Figure 11:
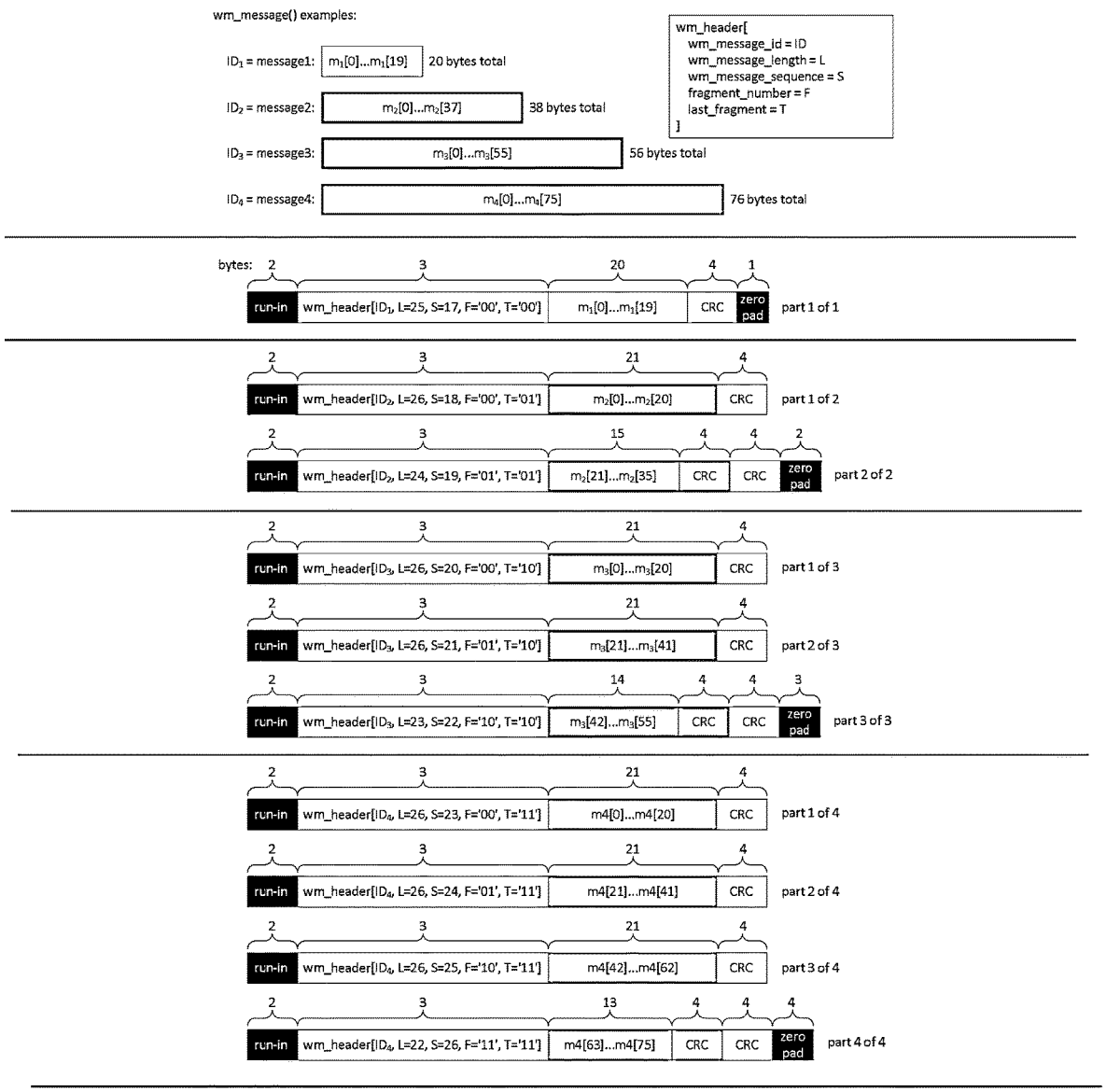
FIG. 11 is a diagram of data-frame segmentation of a video watermark across one or more video frames defining one (no segmentation), two, three, and four-line messages, in accordance with some examples.

The Watermark Decoder 105 monitors for watermarks in the video stream of the television program currently being displayed by the television system 104. An example of the structure of such a video watermark can be found in the public document of the Advanced Television Standards Committer (ATSC) A335 Video Watermarking Standard, which is hereby incorporated by reference in its entirety and for all purposes. FIG. 9, FIG. 10, and FIG. 11, as well as appendix A below, are from the ATSC A335 Video Watermarking Standard. FIG. 9 illustrates and example of a single-data-rate (1×) data signal 902 embedded in the top two lines of a video frame 901. The A335 standard also accommodates a double-data-rate (2×) 1002 encoding system, as illustrated in FIG. 10.

Figure 2:
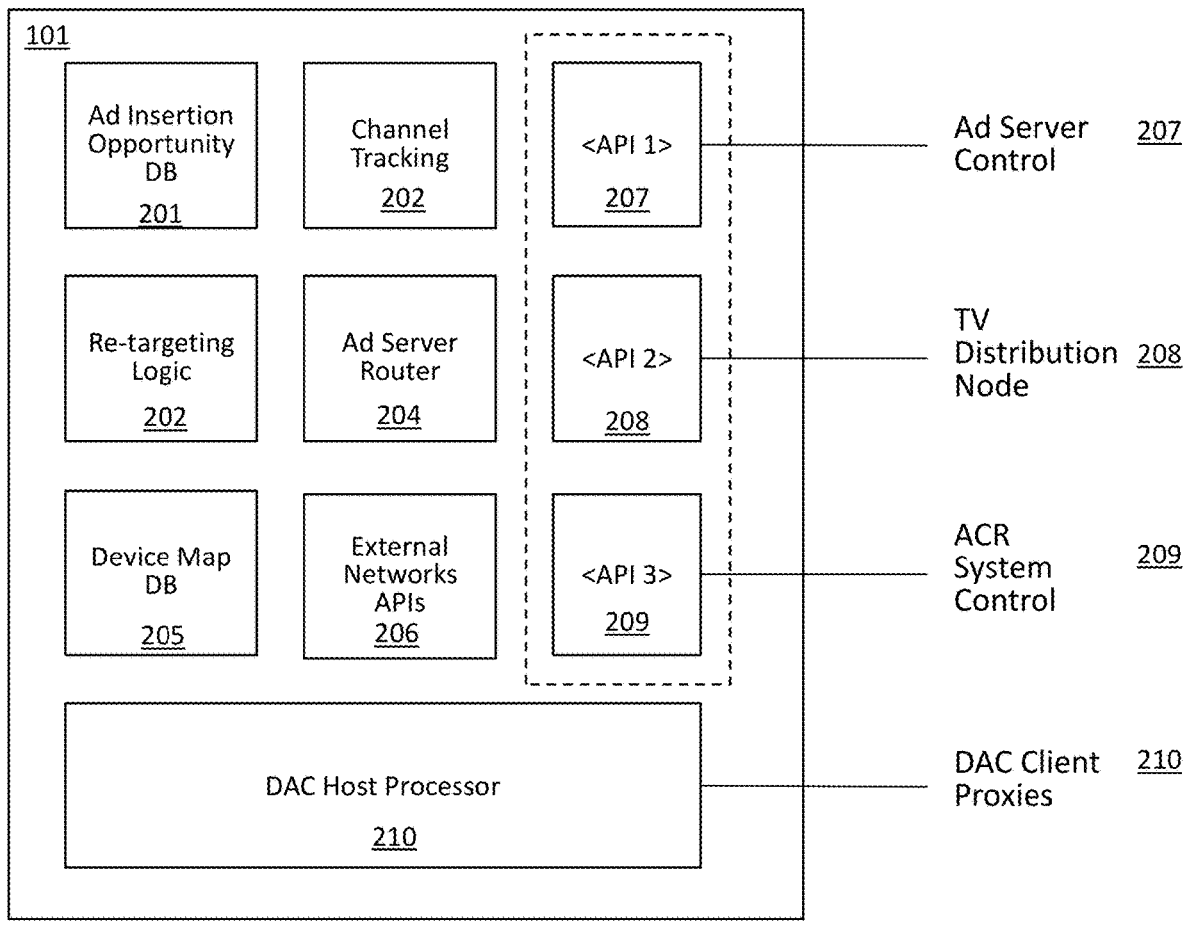
FIG. 2 is a diagram of certain elements of a dynamic content serving system host, in accordance with some examples.
Figure 3:
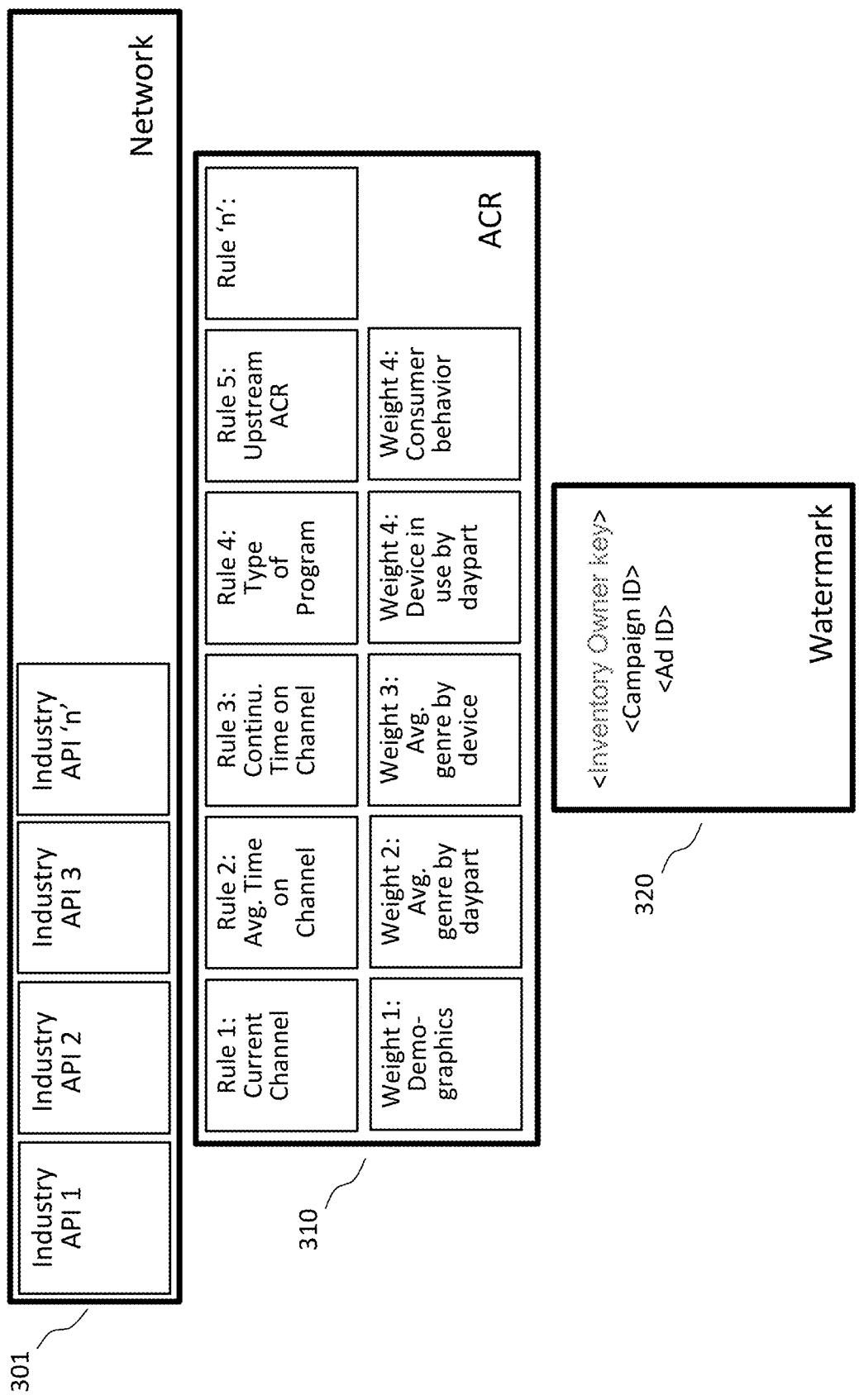
FIG. 3 is a network diagram of the layers of services from the content network through the ACR services to the watermark information, in accordance with some examples.
Figure 4:
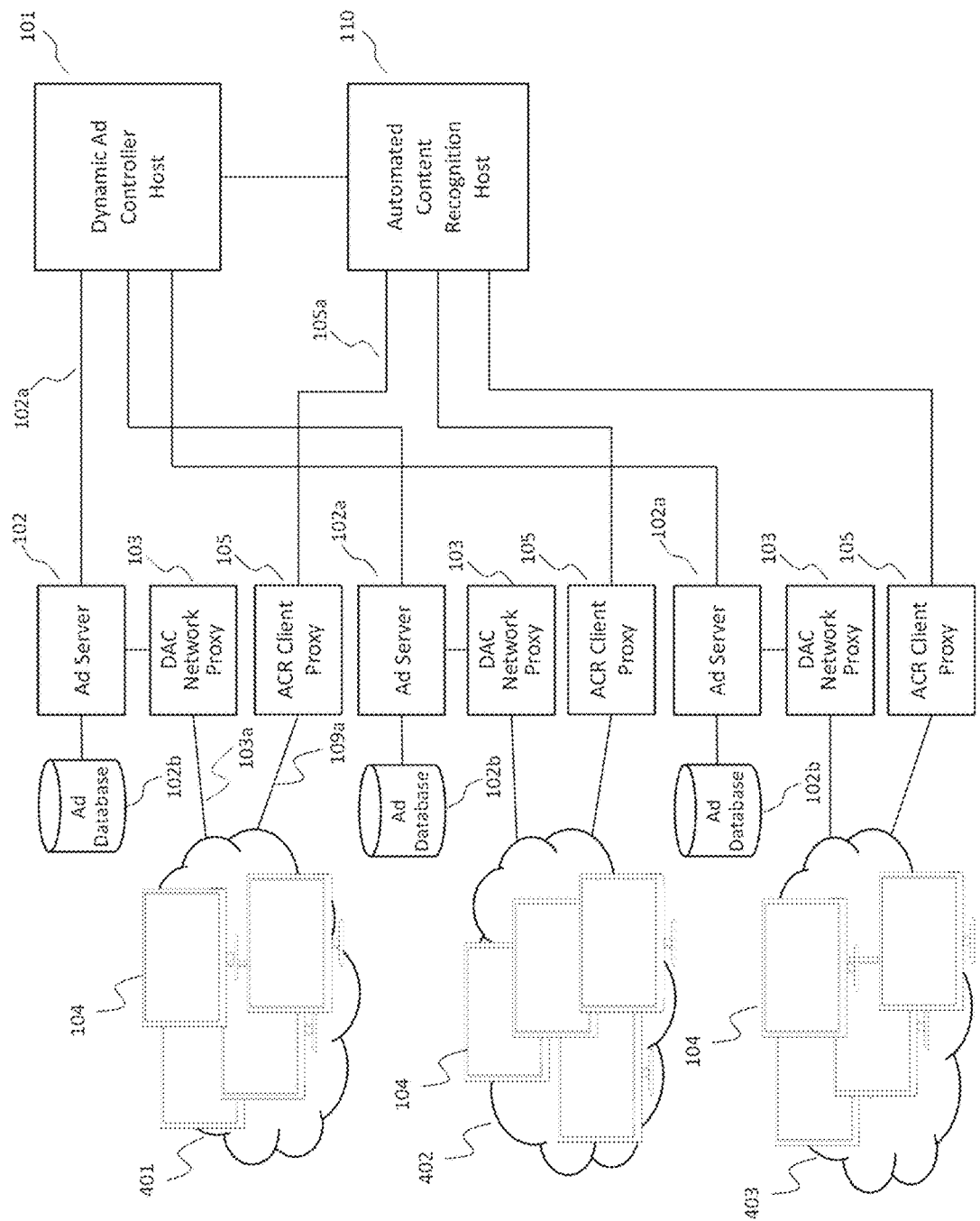
FIG. 4 is a diagram of the high-level architecture of dynamic content serving systems showing service to multiple regions providing access to regionally-specific databases while sharing high-level dynamic content control and ACR support across regions, in accordance with some examples.
Figure 5:
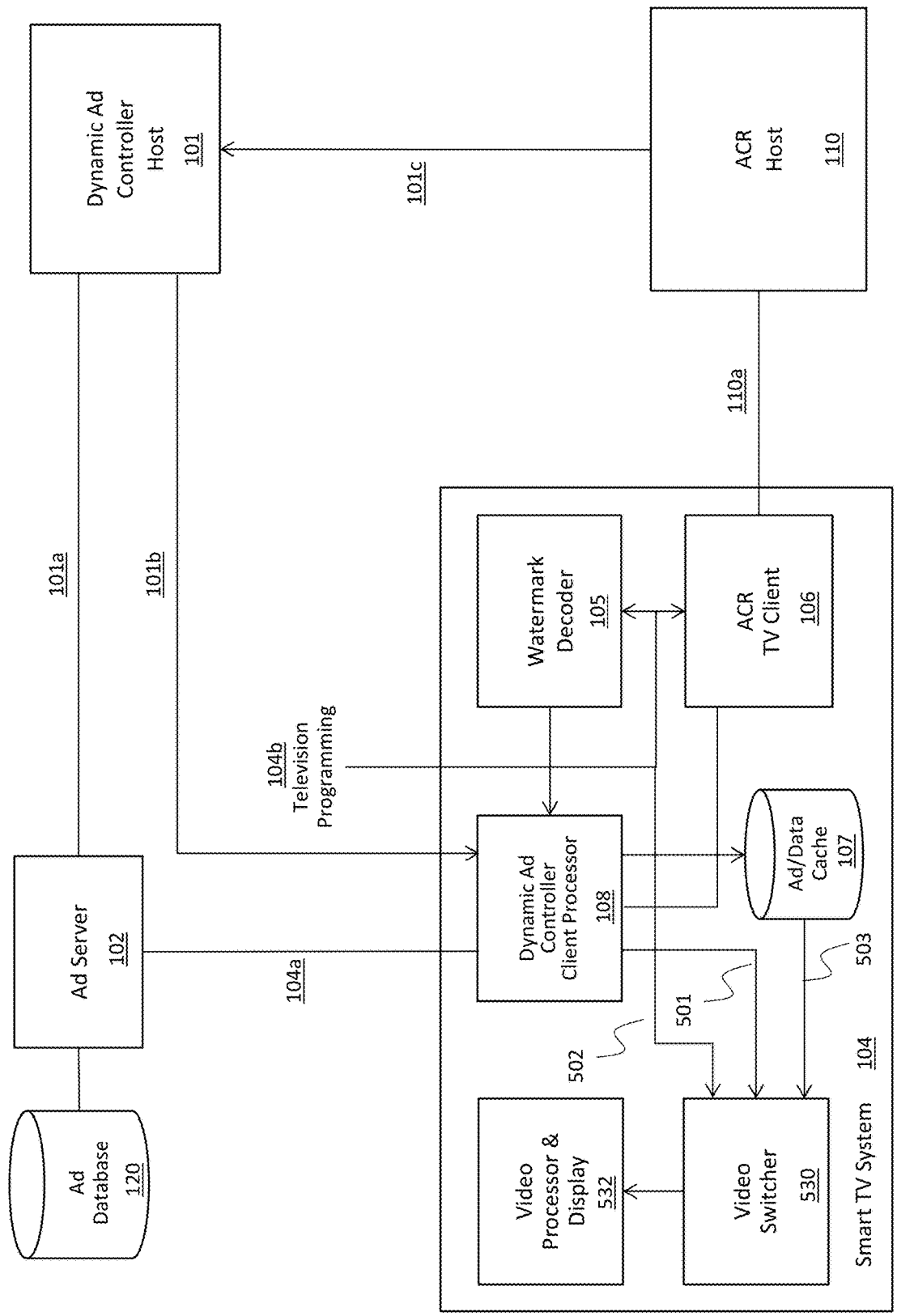
FIG. 5 is a diagram of the dynamic content serving system employing an ACR system for channel awareness and with detail of the processes within a client device to support dynamic ad insertion, in accordance with some examples.

FIG. 2 is a diagram illustrating elements of a dynamic content serving system host. FIG. 3 is a network diagram of the layers of services from the content network through the ACR services to the watermark information. FIG. 4 is a diagram illustrating an example of a high-level architecture of dynamic content serving systems showing service to multiple regions providing access to regionally-specific databases while sharing high-level dynamic content control and ACR support across regions. FIG. 5 is a diagram illustrating a dynamic content serving system employing an ACR system for channel awareness and with detail of the processes within a client device to support dynamic content (e.g., advertisement) insertion.

Upon detection of a watermark by the watermark decoder 105, substitute content (e.g., a substitute advertisement) can be retrieved from the cache (e.g., the advertisement cache 107) and can be displayed in place of original content (e.g., an original advertisement) in the program being displayed. As shown in FIG. 5, a video source switcher 530 is instructed to switch via connection 501 to the internal advertisement cache program input 503 by the Client DAC Processor 108. At the end of the advertisement segment (e.g., 30 seconds later), the video source switcher 530 can be instructed by the Client DAC Processor 108 to switch back to the original program video 502 for display by the video processor and display 532.

Figure 7:
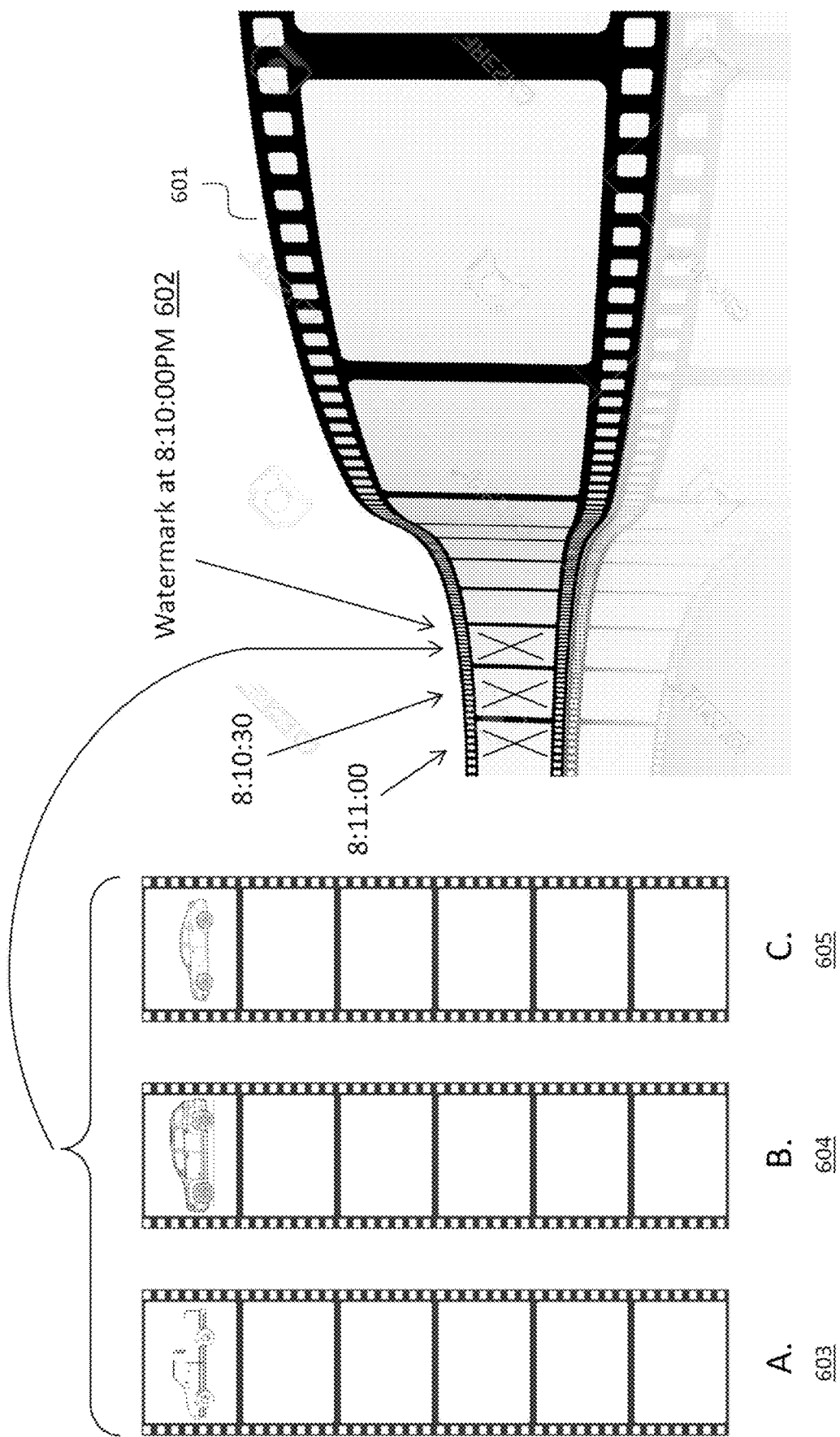
FIG. 7 illustrates the pre-cached alternative versions of a commercial message where one alternative will be dynamically inserted in the ad slot as signaled by a watermark, in accordance with some examples.
Figure 8:
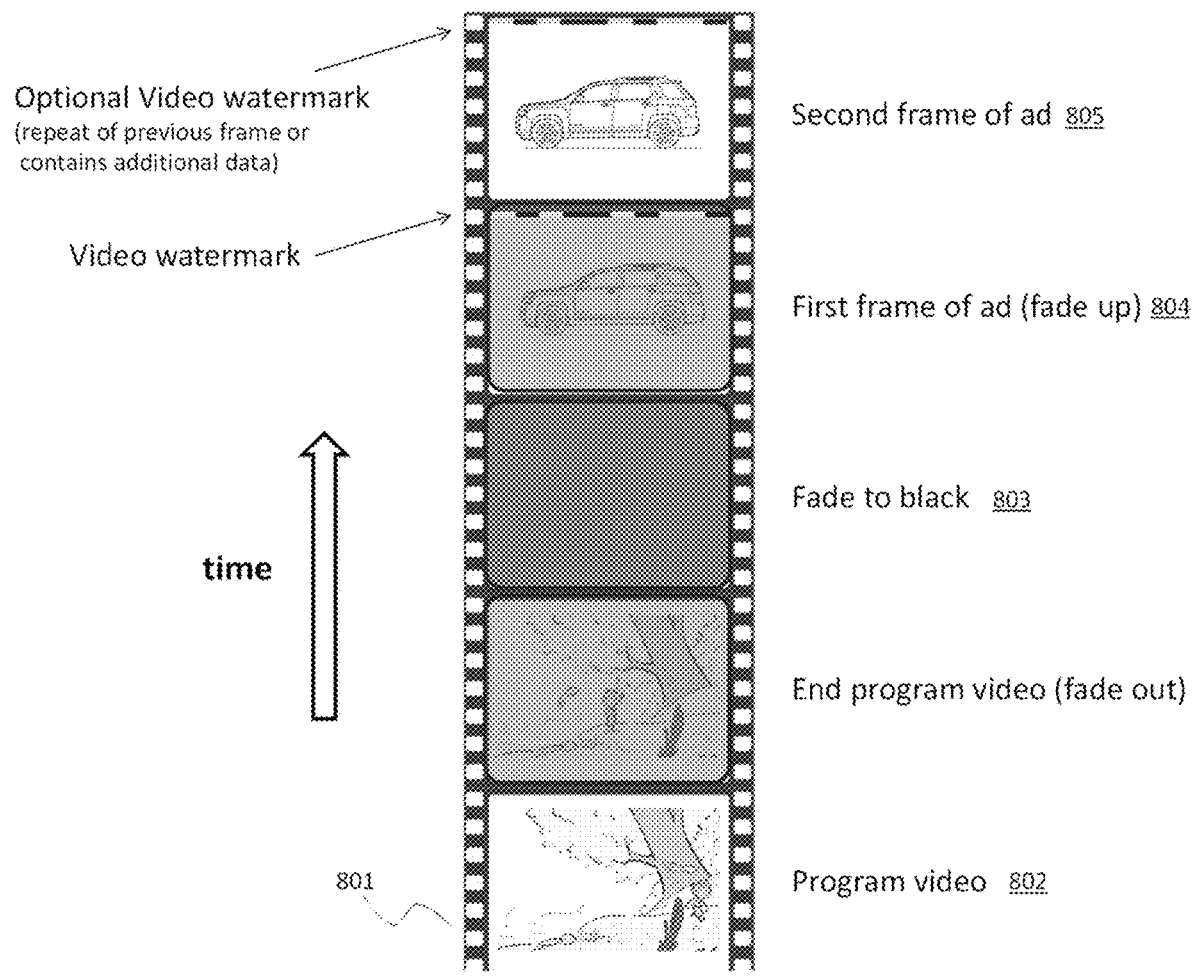
FIG. 8 is an illustration of a hypothetical sequence of video frames showing the placement of a video watermark at the start of an ad video frame, in accordance with some examples.

FIG. 7 is a diagram illustrating an example of the precached alternative versions of a commercial message where one alternative will be dynamically inserted in the advertisement slot as signaled by a watermark. An example of video frames can be seen in FIG. 8, including video frame 801. The current program 802 fades to black at frame 803 for a commercial break where the first frame 804 of the advertisement contains a video watermark embedded in the top two lines of the video information (shown as a dashed grey and black line). Per the ATSC A335 Video Watermarking standard, these two watermark signals should not be visible to the viewer. Additionally, the system could employ a second, third, or more, watermarks in subsequent frames. One use could be for redundancy in the event the advertisement was started slightly late and might be missing the first few frames. Another use might be to carry additional information such as for on-screen product information or ordering available on request of the user via the remote control. When such information is available, the user is notified via an on-screen overlay instructing the user to press a certain button on their remote control to display said information.

Figure 6:
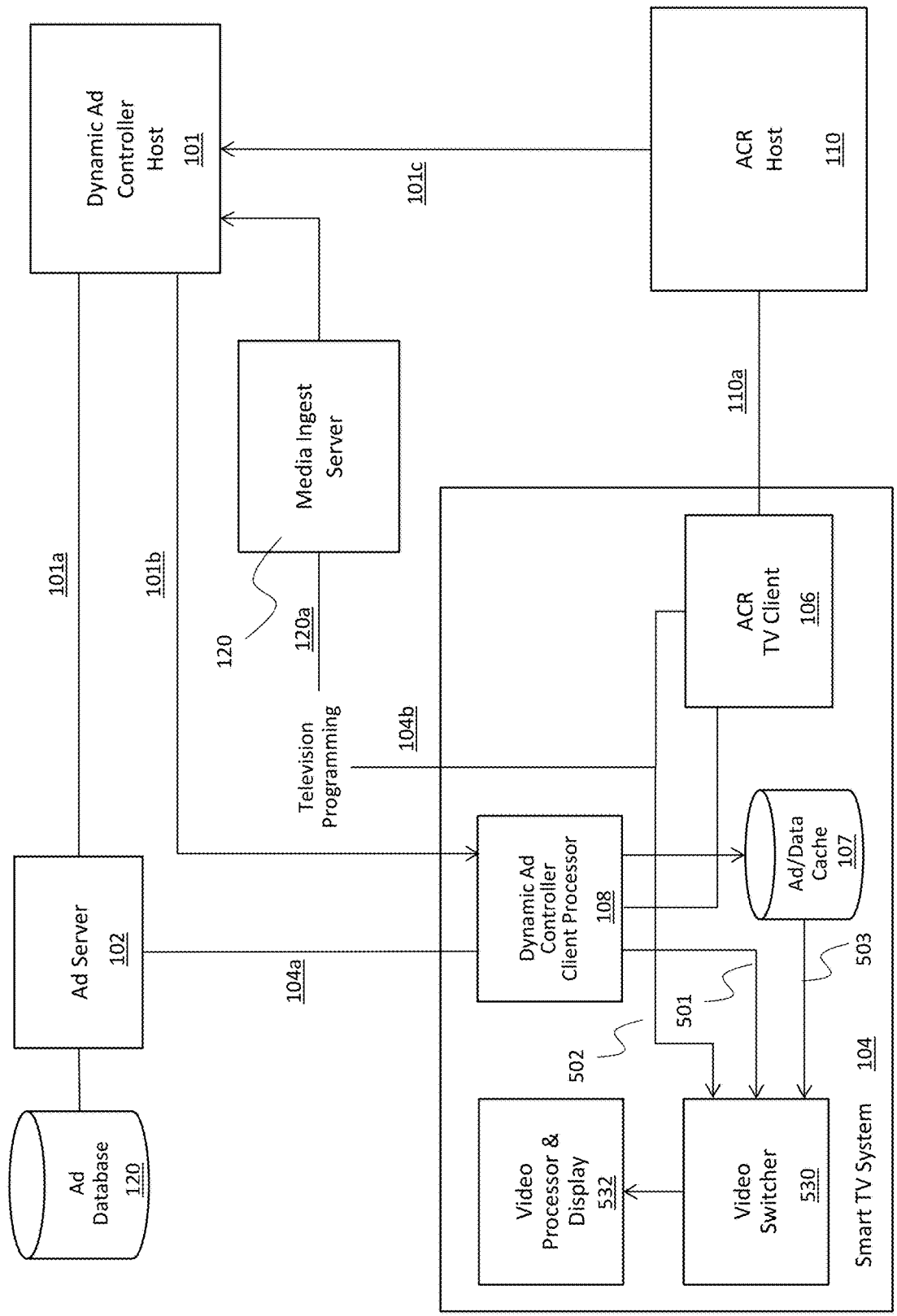
FIG. 6 is a diagram of the dynamic content serving system employing an event detection mechanism upstream of the home client device for channel awareness and with detail of the processes within a client device to support dynamic content insertion, in accordance with some examples.

In some cases, as shown in FIG. 6, knowledge of upcoming content (e.g., an upcoming advertisement break) can be determined by a media ingest server system 120 on a distant network from the client device. The media ingest server system 120 can monitor the content channel or stream upstream of the distribution to subscriber homes. In some examples, the upstream monitoring of media content can be done at a regional distribution node of an MVPD system, where the signal will pass through the distribution node before getting to subscriber devices, which can be a period of time (e.g., several seconds) in advance of the television program being displayed on a television or other client device in a home. This delay through the distribution network can provide enough time to send a timing command to the DAC Host 101, which signals the television system 130 via connection 101b to instruct the Client DAC Processor 108 to switch out the main program advertisement (i.e.—" in 3.65 seconds, replace advertisement on channel 4 with <ad_id>) for the replacement advertisement that is locally stored in the cache 107 of the television system 130. In some cases, the example shown in FIG. 6 can be used as an alternative to using television program watermarks. In some cases, the example shown in FIG. 6 can be used in addition to using television program watermarks.

Control logic can be provided in the Client DAC Processor 108 to stop displaying a substitute advertisement when the ACR System 110 or DAC Host 101 signals a channel change to the Client DAC processor 108 in the television system 130.

Figure 12:
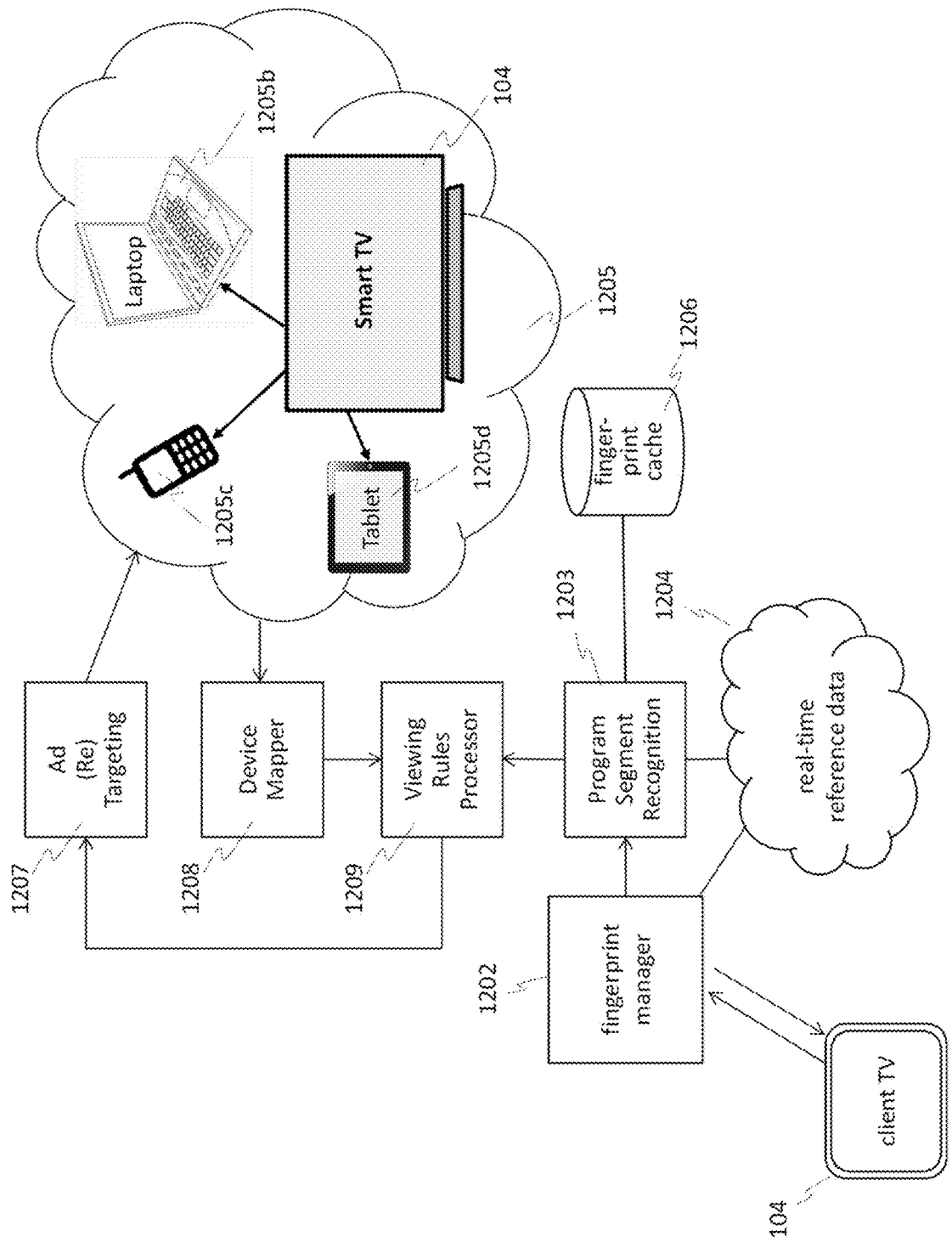
FIG. 12 is a diagram showing an embodiment of an application that creates a map of devices on a local network shared with a client device, in accordance with some examples.

FIG. 12 is a diagram showing an example of an application that creates a map of devices on a local network shared with client device. This example may be configured to provide substitute commercial messages on the display of the client device as well as to redirect advertisements to other devices on a local area network as detected by the device mapper. This example can also send data to devices that may or may not be synchronized to a program displaying on the client device.

As shown in FIG. 12, the Client DAC processor 108 can also be used to serve advertisements and other information to devices on the local area network (referred to as second-screen devices), such as tablet 1205d, smartphone 1205e, and laptop 1205b, among other devices. This process can be referred to as ad redirection. Information sent to second-screen devices can mirror the advertisement on the television system 104, can be a related advertisement, or can include information about the advertisement then displaying on the television system 104. This process is also useful for providing interactive television information (ITV) that could, among other things, provide a window of information about a television program or an actor or other point of interest. This ITV service could also allow on-screen ordering of products during infomercials, for example.

Figure 13:
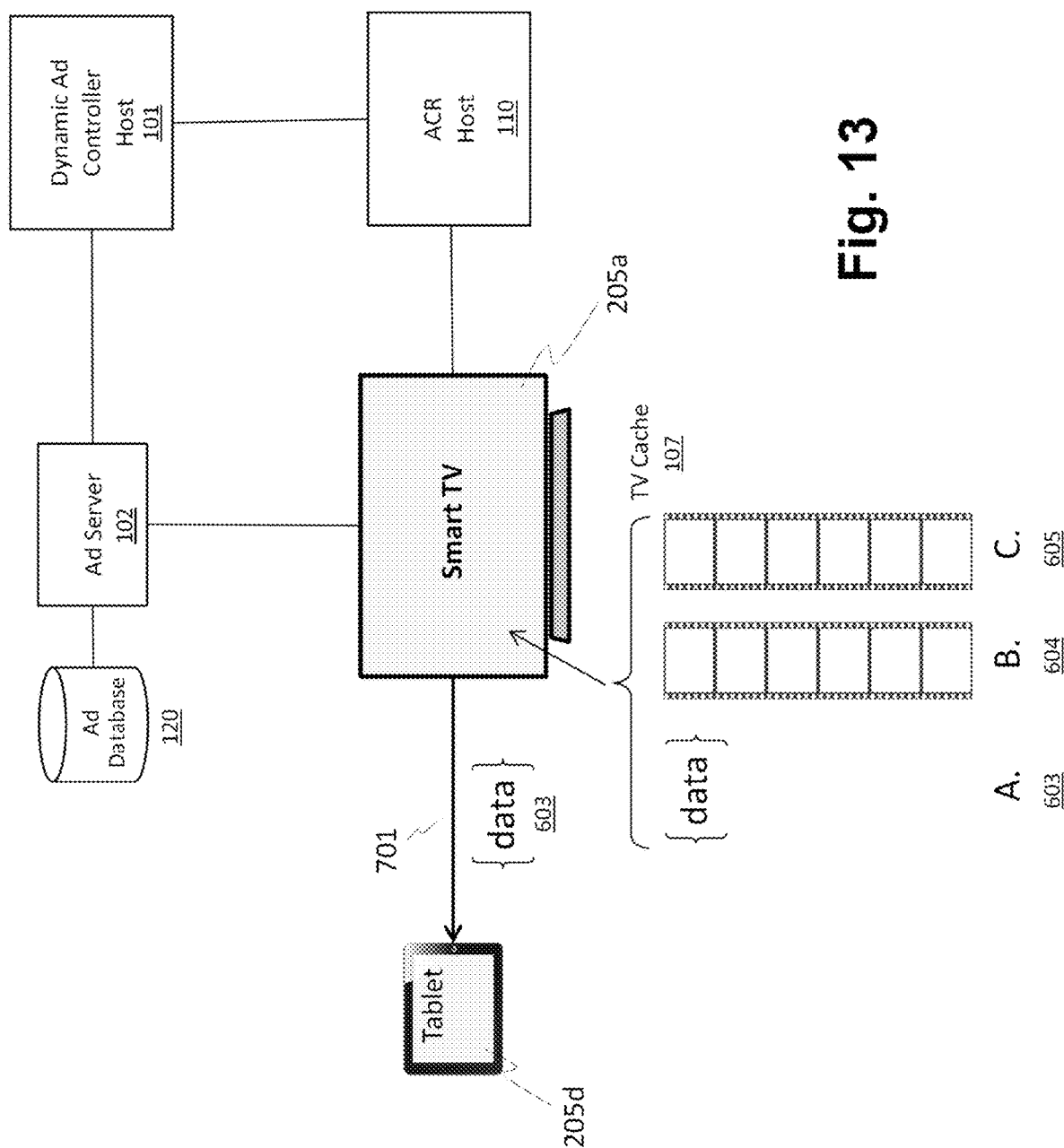
FIG. 13 is a diagram showing an example of the system including a client device that can substitute content on the display of the client device while simultaneously redirecting content to other devices on a local area network, in accordance with some examples.

FIG. 13 is a diagram of an embodiment of the system that is configured to employ a Smart television to substitute commercial messages on the display of the smart television while simultaneously redirecting ads to other devices on a local area network. The system can also cause the smart television to send data to other devices that may or may not be synchronized to a program displaying on the smart television, in accordance with some examples;

External network services may be provided in protocol layers, as shown in FIG. 3. There are many network protocols at layer 301, such as the Interactive Ad Bureau's Video Ad Serving Template (VAST) (an excerpt of which is provided in Appendix B below), that can provide value by standardizing various protocols. Likewise, the middle layer 310 provides a series of proprietary services that the ACR element of the system can provide critical services to the system.

The ACR system can provide additional helpful information and service 310 to determine television actions including: (1) knowledge of the amount of time the television has been continuously tuned to current channel; (2) type of program currently being viewed to help estimate how long the television will remain there for example a television tuned to a football game likely to remain tuned there for the duration; and/or (3) prior viewing habits of the subject home by day and daypart, among many other possibilities.

The bottom layer 320 carries the watermark for triggering the dynamic content substitution actions of the system. For client-side event triggering (where triggering occurs within the respective client device), the watermark is detected by client DAC processor 108 as shown in FIG. 5, as discussed above. For server-side event triggering (where the television is given a countdown to trigger the substitution event), the watermark is detected in the network by the DAC Host 101, as shown in FIG. 6.

An example of components of the Dynamic Ad Controller Host 101 is outlined in FIG. 2, where primary functions of the Host 101 are shown in blocks. The host manages the entire process of dynamic ad serving in all its forms. The most fundamental task for the Host 101 is the scheduling by means of the DAC Host Processor 210 of available dynamic advertisement substitution events for every television channel participating in the DAS program. The Host 101 can accommodate any number of advertisement service providers offering dynamic advertisement media. In some cases, the dynamic advertisement market will utilize common content standards such as the IAB promoted identification protocols called the Video Ad Serving Template (VAST), but even for those dynamic ad providers with proprietary protocols and metadata, the system can still accommodate all providers. In some cases, the dynamic advertisement market may adopt industry standards, such as the ATSC Video Watermark as specified in document A335. Again, proprietary protocols can be managed for those providers not conforming to standards.

The DAC Host 101 also communicates with the Automated Content Recognition server 110, which provides to the DAC Host the current channel to which each client device (e.g., television or other client device) of the service is tuned. This information is processed by the Channel Tracking module 202. The DAC Host combines this information and with the schedule of dynamic advertisements by channel received from the advertisement service providers via advertisement server control 207 and managed by the Ad Server Router 204. The DAC Host Processor 210 then sends a request to each participating Client DAC Processor 108 a list of advertisements for each respective television to download. The DAC Host Processor 210 also informs each client device of which advertisement server 102 to address. In one embodiment of the application, the client devices do not directly address the advertisement server network but rather address a DAC Network Proxy 111 which, in this embodiment, receives all advertisement download requests from all client devices in its service area 501, or 502, or 503, etc. The DAC proxy can then consolidate requests by removing redundancy, can make a greatly reduced number of calls to the advertisement server. The received advertisements from the advertisement server can then be distributed to the respective client devices by the proxy to be stored in the cache memory of each client device.

The television Distribution Node interface 208 receives television program and schedule information from the MVPD distribution center or hub. This information can be used for a variety of functions. One function provides the electronic program guide for the MVPD, which allows the DAC host to anticipate network events and coordinate the network of participating televisions with either advanced advertisement downloading and/or supplemental information that may be provided by the system described herein.

In some examples, the Host 101 (e.g. using the Distribution Node interface 208 and/or the DAC Host Processor 210) can search participating television channels for watermarks instead of the individual client devices performing this task. When a watermark is detected by the Host 101, commands can be sent to each client device turned to the channel with the watermark to substitute a replacement advertisement in a set number of seconds, which is the time delay between the distribution center and the home viewing the television channel from the center. This delay (or latency) can be on the order of a several seconds or more. Different techniques can be used to determine the time delay between each distribution center and the client device viewing the program. One example includes using a black frame detector for a channel in the distribution center. The client devices can also include a black frame detector. When the client device detects a black frame, a process in the client device can record the current time to the hundredth of a second, and can send the time of day information to the distribution center. The distribution center can compare the time of day information to the time the black frame was detected in the center. If the measured time at the distribution center to a given home is, for example, 3.54 seconds, then when a watermark is detected at the distribution center, signaling a video segment substitution event, the DAC host can inform the television to count down from 3.54 (and in some cases, minus other processing delays) and then perform a video segment substitution.

The DAC Host processor 210 can also conduct period device mapping of the local area network to which a client device is connected. This process maintains individual device maps per client device (e.g., television) in the Device Map Database 205. A device map is a list of devices such as tablets, smartphones, and laptops connected by wire or WiFi to the local area network to which the client device (e.g., television) is attached. This information is used by the Host 101 to provide a variety of services to one or more users. Such services might include advertisement redirection where an advertisement related to the advertisement displaying on a television (or other client device) is sent to a mobile device, as identified by the device map for the local area network to which the television is connected. Another service might be providing supplemental information about a television program currently playing, for example, a reality television program where the service provides information about the contestants to a second-screen device connected to the local area network of the television.

Figure 14:
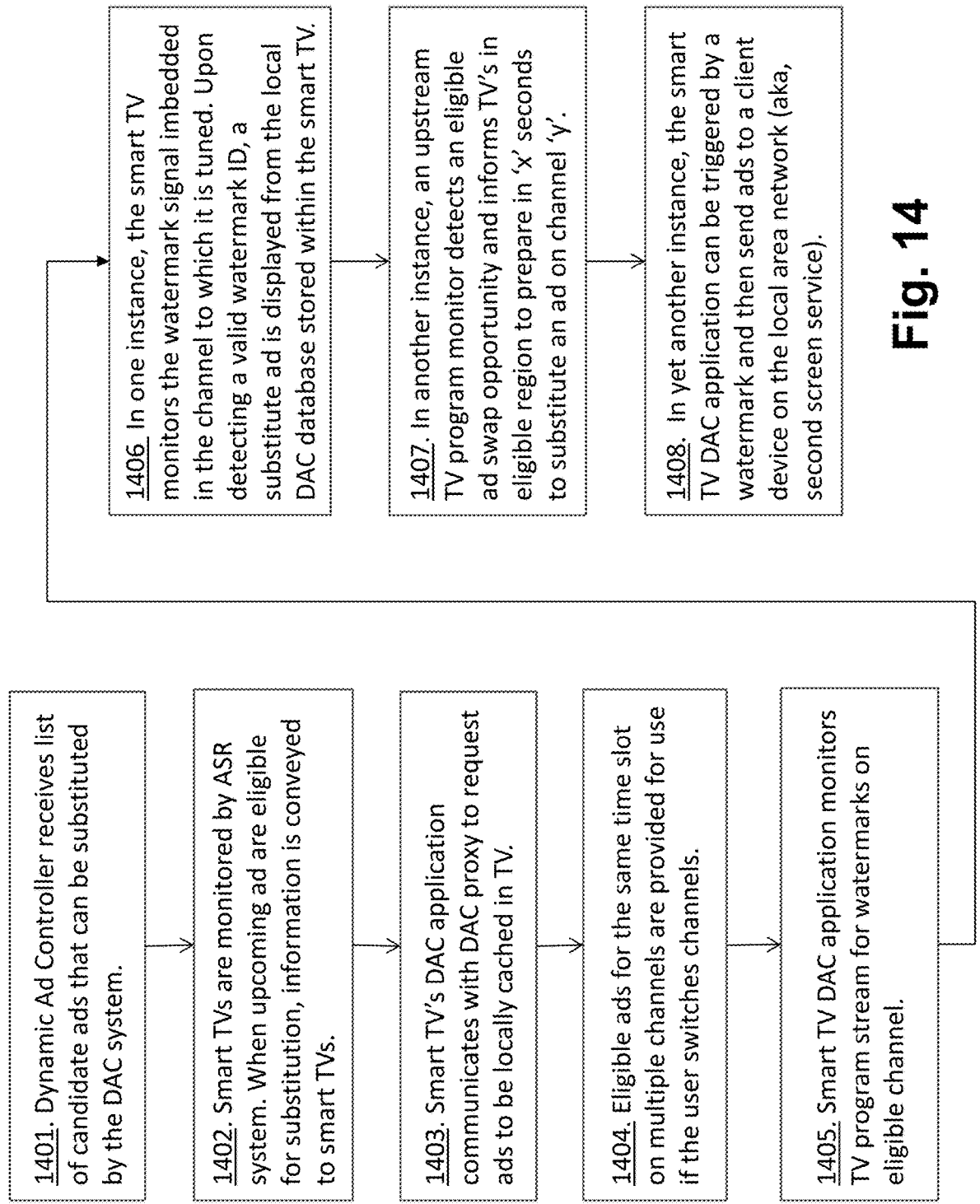
FIG. 14 flow chart of the steps of a method of the system that dynamically replaces advertising segments in near real-time, in accordance with some examples.
Figure 15:
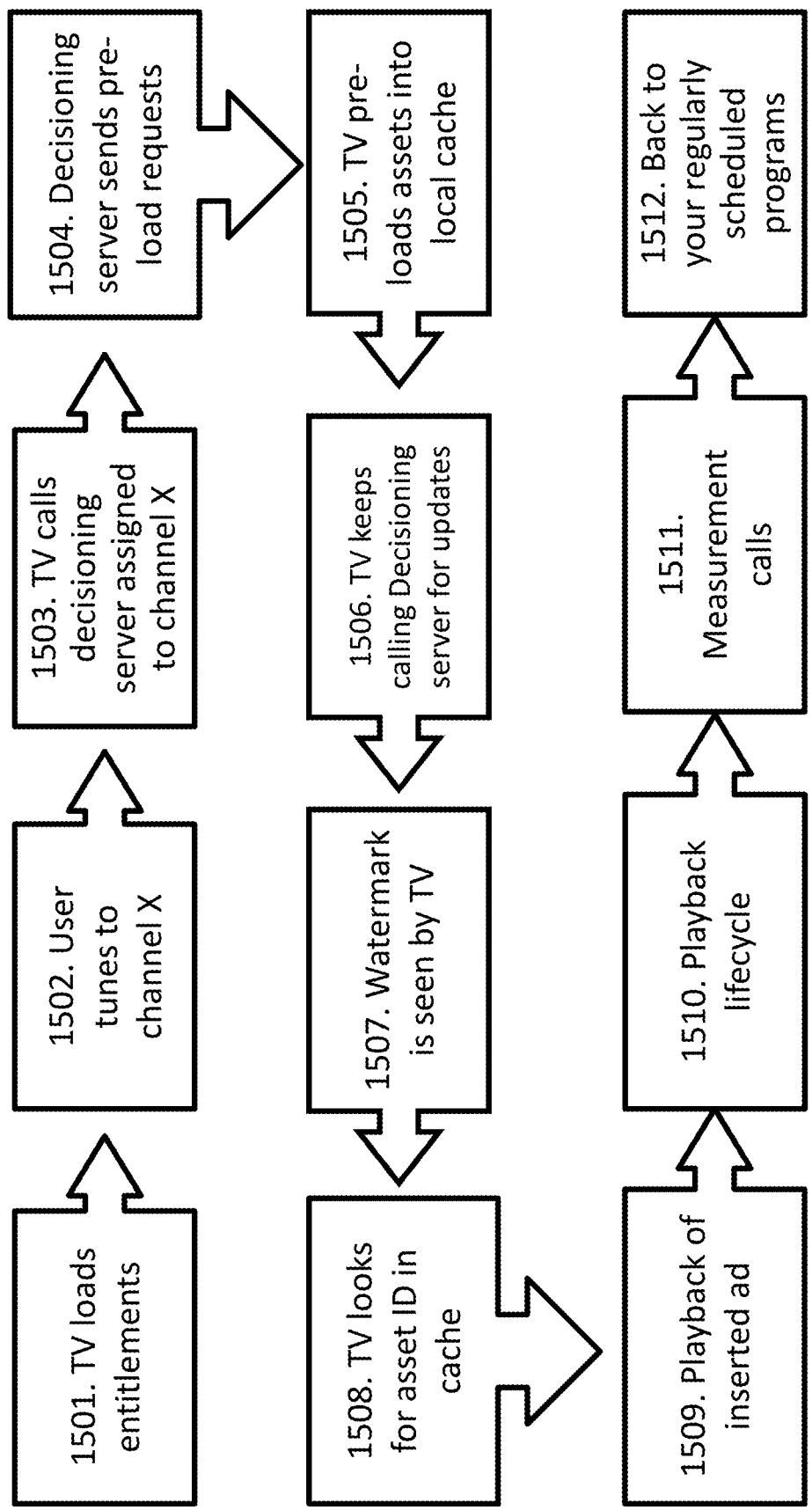
FIG. 15 is a flow chart of client television processing a dynamic ad insertion event, in accordance with some examples.

The Client television 104 sequence of events is outlined in FIG. 14. The steps have been discussed in the paragraphs above.

As described herein, the application provides an optimal platform for an efficient deployment of a dynamic content substitution system. A clear advantages of having the knowledge of the channel to which a client device is tuned allows the system to preload media assets as needed and, hence, to deploy the minimum amount of hardware and software yet maintain an optimally responsive service with content substitution and/or redirection (e.g., advertisement substitution and redirection) performed in a timely and unobtrusive manner.

Using the techniques described herein, a dynamic content serving system can use information from an ACR system to gain knowledge of a media channel or stream (e.g., a television channel) to which a client device (e.g., a smart television or other device) is tuned and use that knowledge in combination with a prior obtained list of channels and times of dynamic content (e.g., advertisement spots) on various channels or streams. The resulting information instructs respective client device systems to prefetch substitute television content (e.g., advertisements) and to cache the content (e.g., advertisements) within the system of the client device. The client device can then continuously monitor for a watermark signal embedded in the video signal of a program being displayed. Upon detection of the signal, the client device system decodes the signal and uses the information to search its internal memory for a second video segment (related to substitute content, such as substitute advertisements) to substitute for the first video segment as delineated by the watermark signal imbedded therein.

In some cases, the dynamic content serving system can use a Dynamic Controller Network Proxy (e.g., a Dynamic Ad Controller (DAC) Network Proxy) to serve as an addressable router where multiple client devices (e.g., televisions) in a regional network of client devices make a request for one or more video segments (e.g., television advertisements) to store locally in the client devices in anticipation of an upcoming event eligible for video segment substitution. The network proxy can consolidate many requests from the many client devices in order to find common requests. As noted above, a Parrado-like curve (aka—the 80/20 rule) exists in television viewing such that a large plurality of television system may be tuned to a small subset of the available television channels. The dynamic content serving system may thus experience parallel requests for the same video segment assets (e.g., television advertisements) from a large number of client devices, imparting a heavy load on the third-party content servers (e.g., advertisement servers). The network proxy can greatly reduce the burden by consolidating multiple requests from many client devices into a single request per video segment title.

In some examples, the dynamic content serving system can produce device maps of candidate second-screen devices that are on the same local area network as the client device sending a request for substitute content (e.g., a smart television or other device). The device map information can be used to provide content to one or more the second-screen devices of the network in synchronization with watermarks embedded in a television signal.

As described above, ACR information can be used to determine which channel or stream a client device is displaying. Matching video segments of television programming will be used below as one example of an ACR technique. However, one of ordinary skill in the art will appreciate that the techniques and systems described herein can be applied using any type of content recognition system.

Figure 16:
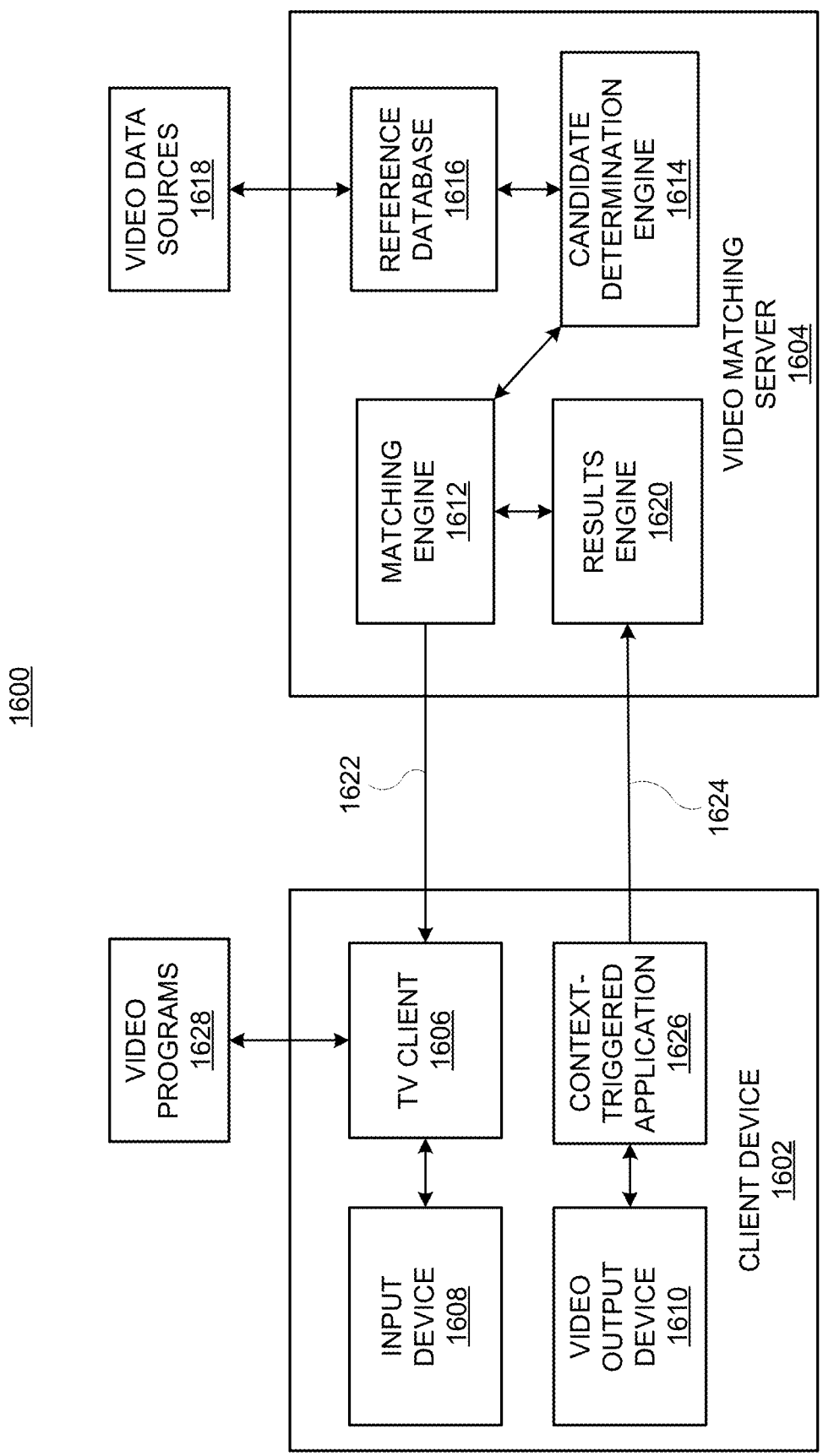
FIG. 16 is a diagram illustrating an example of a video matching system, in accordance with some examples.

FIG. 16 illustrates an example of a video matching system 1600 that can improve data efficiency using the vector projection techniques described herein. A television (TV) client 1606 of a client device 1602, which can include a television system, can decode television signals associated with video programs 1628. The TV client 1606 can place the decoded contents of each frame of the video into a video frame buffer in preparation for display or for further processing of pixel information of the video frames. A client device 1602 can be any television decoding system that can receive and decode a video signal. The client device 1602 can receive video programs 1628 and store video information in a video buffer (not shown). The client device 1602 can processes the video buffer information and produces unknown data points (which can referred to as "cues"), described in more detail below with respect to FIG. 18. The TV client 1606 can transmit the unknown data points to the video matching server 1604 for comparison with reference data points in the reference database 1616, similar to the techniques described above.

The matching system 1600 can begin a process of matching video segments by first collecting data samples from known video data sources 1618. For example, the video matching server 1604 collects data to build and maintain a reference video database 1616 from a variety of video data sources 1618. The video data sources 1618 can include television programs, movies, or any other suitable video source. The video data sources 1618 can be provided as over-the-air broadcasts, as cable TV channels, as streaming sources from the Internet, and from any other video data source. In some embodiments, the video matching server 1604 can process the received video from the video data source 1618 to generate and collect reference video data points in the reference database 1616, as described below. In some embodiments, video programs from video data sources 1618 can be processed by a reference video program ingest system (not shown), which can produce the reference video data points and send them to the reference database 1616 for storage. The reference data points can be used as described above to determine information that is then used to analyze unknown data points. For example, the reference data points can be analyzed with respect to a plurality of projected vectors to obtain left and right binary data. The lengths of vectors related to the reference data points can also be determined. Once the lengths of the reference data point vectors and left and right binary data are determined for the reference data points, the actual reference data point bits can be discarded.

The video matching server 1604 can store reference video data points for each video program received for a period of time (e.g., a number of days, a number of weeks, a number of months, or any other suitable period of time) in the reference database 1616 until the necessary information is determined. The video matching server 1604 can build and continuously or periodically update the reference database 1616 of television programming samples (e.g., including reference data points, which may also be referred to as cues or cue values). In some examples, the data collected is a compressed representation of the video information sampled from periodic video frames (e.g., every fifth video frame, every tenth video frame, every fifteenth video frame, or other suitable number of frames). In some examples, a number of bytes of data per frame (e.g., 25 bytes, 50 bytes, 75 bytes, 100 bytes, or any other amount of bytes per frame) are collected for each program source. Any number of program sources can be used to obtain video, such as 25 channels, 50 channels, 75 channels, 100 channels, 200 channels, or any other number of program sources. Using the example amount of data, the total data collected during a 24-hour period over three days becomes very large. Therefore, discarding the actual reference video data point bits is advantageous in reducing the storage load of the video matching server 1604.

Figure 17:
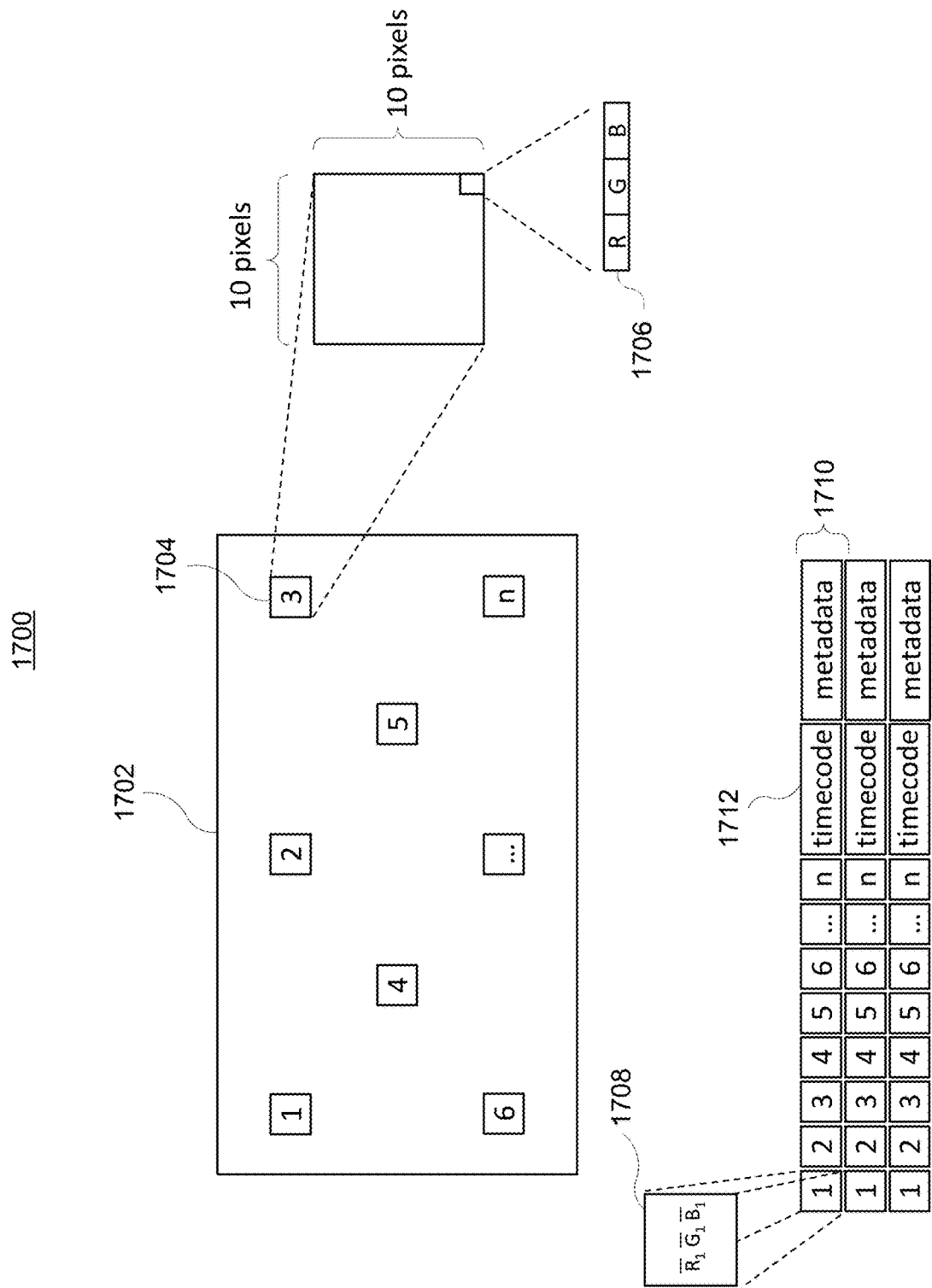
FIG. 17 is a diagram illustrating an example of a video ingest capture system, in accordance with some examples.

In one illustrative example, FIG. 17 illustrates a video ingest capture system 1700 including a memory buffer 1702 of a decoder. The decoder can be part of the video matching server 1604 or the TV client 1606. The decoder may not operate with or require a physical television display panel or device. The decoder can decode and, when required, decrypt a digital video program into an uncompressed bitmap representation of a television program. For purposes of building a reference database of reference video data (e.g., reference database 1616), the video matching server 1604 can acquire one or more arrays of video pixels, which are read from the video frame buffer. An array of video pixels is referred to as a video patch. A video patch can be any arbitrary shape or pattern but, for the purposes of this specific example, is described as a 10×10 pixel array, including ten pixels horizontally by ten pixels vertically. Also for the purpose of this example, it is assumed that there are 25 pixel-patch positions extracted from within the video frame buffer that are evenly distributed within the boundaries of the buffer.

An example allocation of pixel patches (e.g., pixel patch 1704) is shown in FIG. 17. As noted above, a pixel patch can include an array of pixels, such as a 10×10 array. For example, the pixel patch 1704 includes a 10×10 array of pixels. A pixel can include color values, such as a red, a green, and a blue value. For example, a pixel 1706 is shown having Red-Green-Blue (RGB) color values. The color values for a pixel can be represented by an eight-bit binary value for each color. Other suitable color values that can be used to represent colors of a pixel include luma and chroma (Y, Cb, Cr) values or any other suitable color values.

A mean value (or an average value in some cases) of each pixel patch is taken, and a resulting data record is created and tagged with a time code (or time stamp). For example, a mean value is found for each 10×10 pixel patch array, in which case twenty-four bits of data per twenty-five display buffer locations are produced for a total of 600 bits of pixel information per frame. In one example, a mean of the pixel patch 1704 is calculated, and is shown by pixel patch mean 1708. In one illustrative example, the time code can include an "epoch time," which representing the total elapsed time (in fractions of a second) since midnight, Jan. 1, 1970. For example, the pixel patch mean 1708 values are assembled with a time code 1712. Epoch time is an accepted convention in computing systems, including, for example, Unix-based systems. Information about the video program, known as metadata, is appended to the data record. The metadata can include any information about a program, such as a program identifier, a program time, a program length, or any other information. The data record including the mean value of a pixel patch, the time code, and metadata, forms a "data point" (also referred to as a "cue" or a "fingerprint"). The data point 1710 is one example of a reference video data point.

Figure 18:
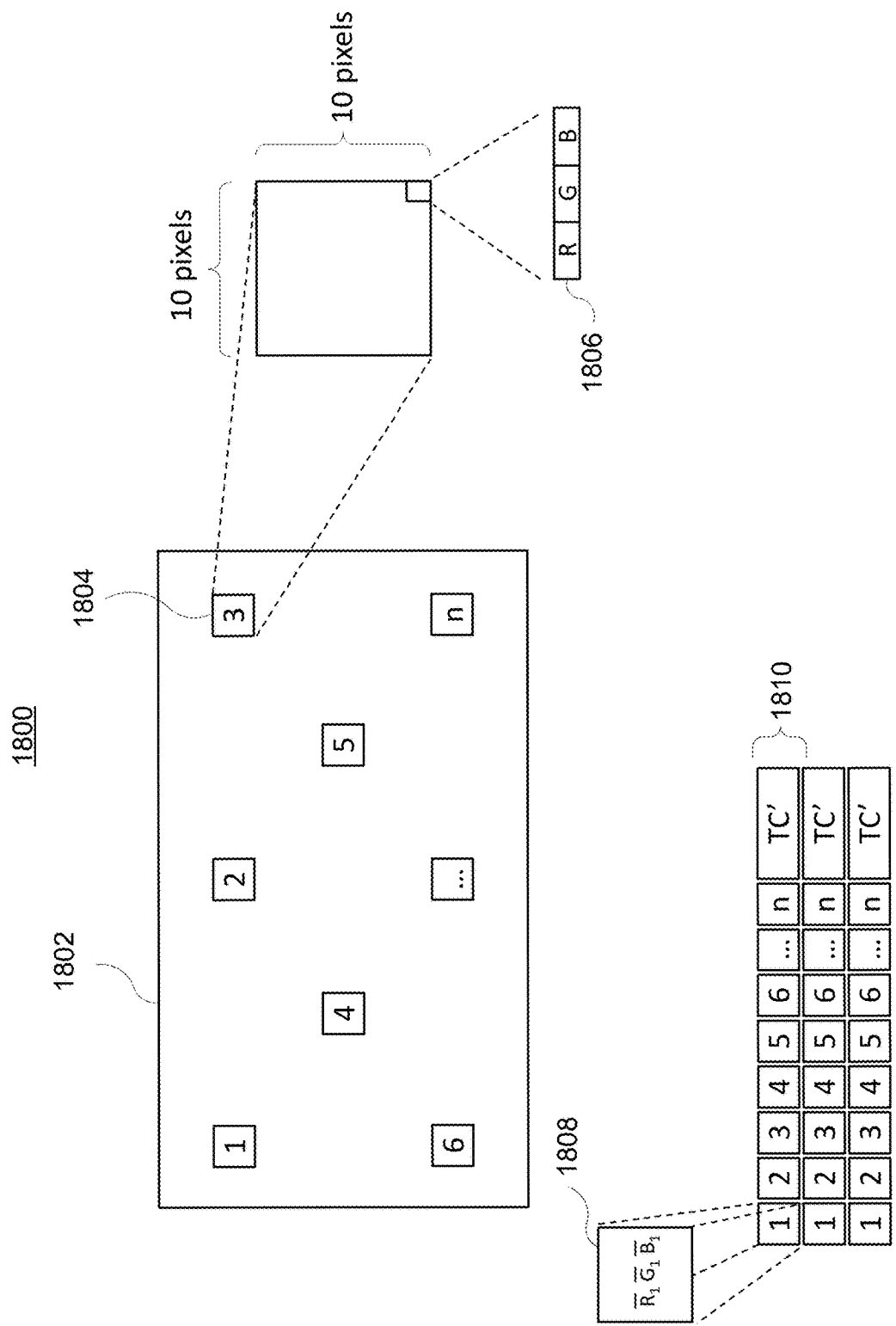
FIG. 18 is a diagram illustrating an example of a video capture system, in accordance with some examples.

A process of identifying unknown video segments begins with steps similar to creating the reference database. For example, FIG. 18 shows a video capture system 1800 including a memory buffer 1802 of a decoder. The video capture system 1800 can be part of the client device 1602 (e.g., a television system) that processes television data presented by a display (e.g., on an Internet-connected television monitor, such as a smart TV, a mobile device, or other television viewing device). The video capture system 1800 can utilize a similar process to generate unknown video data point 1810 as that used by system 1700 for creating reference video data point 1710. In one example, the TV client 1606 can transmit the unknown video data point 1810 to the video matching server 1604 to be identified by the matching server 1604.

As shown in FIG. 18, a video patch 1804 can include a 10×10 array of pixels. The video patch 1804 can be extracted from a video frame being presented by a display. A plurality of such pixel patches can be extracted from the video frame. In one illustrative example, if twenty-five such pixel patches are extracted from the video frame, the result will be a point representing a position in a 75-dimension space. A mean (or average) value can be computed for each color value of the array (e.g., RGB color value, Y, Cr, Cb color values, or the like). A data record (e.g., unknown video data point 1810) is formed from the mean pixel values and the current time is appended to the data. One or more unknown video data points can be sent to the video matching server 1604 to be matched with data from the reference database 1616 using the vector projection techniques described above.

A person of ordinary skill will know that a reference database 1616 storing actual reference data point bit values creates such a large search space that would require extensive computing resources to search and match data. The vector projection techniques described herein offer a significantly more efficient means to search large databases without the need to actually store large values representing the reference data points (also known as reference data cues).

APPENDIX A: ATSC A335 DESCRIPTION OF VIDEO WATERMARK STANDARD A335

The video element of a broadcast program can encode a data stream that may be recovered from uncompressed video by the receiver. An ATSC 3.0 receiver that is receiving video via an HDMI interface can use this data stream for a variety of purposes, including hybrid (broadband) delivery of program elements such as those needed to support interactivity, dynamic ad replacement, service usage monitoring, and content identification.

The video watermarking technology specified herein involves modulation of the luma component of video within the first two lines of each video frame. Two encoding options are offered, one providing a watermark payload of 30 bytes per frame (a "1×" version), and the second "2×" version offering double that capacity (by employing four levels of luminance).

Visibility of this video watermark is not anticipated to be an issue because ATSC 3.0-aware receivers are expected to be designed with the knowledge that the first to lines of video may include this watermark, and will thus avoid displaying (by any means desired). The majority of HDTV display systems in use in 2015 operate by default in an "overscan" mode in which only the central ~95% of video lines are displayed. Thus, if watermarked video is delivered to a non-ATSC 3.0-aware receiver, the watermark would not normally be seen.

The 1× version of the watermark encodes the payload data using luma values of black and a dark gray, which renders the watermark unobtrusively even if the display happens to present all 1080 lines of the HD image. The choice between larger payload and much-reduced visibility can be made by the broadcaster.

The full range of luma values on the Y-axis for 8-bit video encoding and the range of black to white are defined in SMPTE ST 274M of 16 to 235. As shown, for the 2× system, four levels of luma are used for the encoding, the black and white levels as well as two intermediate shades of gray (levels 89 and 162).

Modulation levels for the 1× system are flexible to allow the broadcaster to set the desired balance between visibility and robustness. The luma level for the "0" value of the symbol is set at 4 (for 8-bit video encoding), but the luma value used for the "1" value may be set to any value in the range 40 to 100. The receiver is expected to take note of the modulation value in use and set a slicing level as appropriate. FIG. 4.3 of the standard depicts the two cases on the extremes of this range. On the left, the modulation levels are 4 and 40, and the receiver sets an optimum slicing level of 22. On the right, the modulation levels are 4 and 100, and the receiver sets an optimum slicing level of 52. An algorithm that receivers may use to determine the optimum slicing level is given in Annex A.

ATSC A335 Video Watermark Specification

Digital data may be encoded within the luma component of the first two lines of video. This section normatively specifies the emission format of the video watermark, and the syntax and semantics of the watermark payload. Two emission formats are specified: a normal- and a high-rate version. The regular format, called the "1× Data Rate Video Watermark," or "1× system," encodes 30 bytes per frame of video, while the high-rate version, called the "2× Data Rate Video Watermark," or "2× system," doubles that to 60 bytes per frame.

The watermark payload is delivered within luma values; for all marked content, the chroma values for all video samples in lines 1 and 2 shall be set to zero.

ATSC A335 Video Watermark Run-In Pattern

For both the 1× and 2× systems, a run-in pattern consisting of 16 bits of encoded data is included within the first portion of the watermark payload. Receivers are expected to determine whether a given frame of video is marked or unmarked by first processing the luma values in the first portion of line one of uncompressed video to determine whether a valid run-in pattern is present. Receivers are expected to look for both the 1× and 2× run-in patterns to determine which encoding (if any) is in use in a given frame.

For both 1× and 2× systems, the run-in pattern shall consist of a payload data value of 0xEB52, delivered most-significant bit first. The receiver is expected to analyze line 1 of the video and search for the appearance of this run-in pattern, modulated using either the 1× or 2× system parameters. If not found using the extraction algorithm suitable for the 1× system, it is expected to look for it using the 2× system.

ATSC A335 Watermark Data Symbols

For the 1× system, two-level encoding is used so that each symbol represents one bit of payload data, while for the 2× system, four-level encoding is used and each symbol represents two bits of data. For both the 1× and 2× systems, 240 symbols shall be encoded within the video line, regardless of the horizontal resolution of the video. Thus, for HD encodings of 1920 pixels horizontally, 8 pixels will convey the information of one symbol. For HD encodings of 1440 pixels, 6 pixels will encode one symbol. Table 5.1 summarizes the number of pixels per symbol for typical horizontal resolutions.

TABLE 5.1

Horizontal Pixels per Symbol

| Horizontal Resolution | Pixels per Symbol |
| --- | --- |
| 1440 | 6 |
| 1920 | 8 |
| 3840 | 16 |

ATSC A335 Video Watermark Spatial Redundancy

The watermark payload is recovered in the receiver by processing line 1 of the video, however the encoder shall include the same watermark payload on both lines 1 and 2 of any given video frame. This spatial redundancy reduces the burden on the video encoder during the encoding process and helps ensure the watermark survives more aggressive compression.

ATSC A335 1× Data Rate Video Watermark

Video signals encoded using the 1× version of the video watermark shall use 2-level modulation of the luma level to deliver one bit per symbol time. Luma values used to encode binary data in the 1× system watermark shall conform to Table 5.2 below. Values are shown for 8-, 10- and 12-bit video encoding. Luma values are shown in both hexadecimal and decimal format in the Table.

TABLE 5.2

Luma Value Encodings for 1X System

| Bits per symbol | Encoded Data | Luma Value 8-bit | 10-bit | 12-bit |
| --- | --- | --- | --- | --- |
| 1 | 0 | 0x04 (4) | 0x010 (16) | 0x40 (64) |
|   | 1 | 0x28 (40) to 0x64 (100) | 0x0A0 (160) to 0x190 (400) | 0x280 (640) to 0x640 (1600) |

Note that in the 1× system a range of values is allowable for the "1" value. Lower values result in less visibility at the cost of lower robustness against errors introduced by video compression or transcoding. Higher values can be used if greater robustness is desired. The receiver is expected to determine an appropriate slice point for recovery of the watermark based on the observed luma values. It is noted that a slice point is the luma value used by the receiver to determine whether a received symbol represents a "1" or a "0." It would typically be set halfway between the luma value used to encode the "0" and the luma value used to encode the "1." Guidance for receiver manufacturers regarding how to determine the optimum slice point is given in Annex A.

ATSC A335 2× Data Rate Video Watermark

Video signals encoded using the 2× version of the video watermark shall use 4-level modulation of the luma level to deliver two bits per symbol time. Luma values to encode binary data in the 2× system watermark shall conform to Table 5.3 below. Values are shown for 8-, 10- and 12-bit video encoding. Values are indicated in both hexadecimal and decimal format.

TABLE 5.3

Luma Value Encodings for 2X System

| Bits per symbol | Encoded Data | Luma Value 8-bit | 10-bit | 12-bit |
| --- | --- | --- | --- | --- |
| 2 | 00 | 0x10 (16) | 0x040 (64) | 0x100 (256) |
|   | 01 | 0x59 (89) | 0x164 (356) | 0x590 (1424) |
|   | 10 | 0xA2 (162) | 0x288 (648) | 0xA29 (2592) |
|   | 11 | 0xEB (235) | 0x3AC (940) | 0xEB0 (3760) |

APPENDIX B: VAST (VIDEO AD SERVING TEMPLATE) DEFINITION

Video Ad Serving Template (VAST) is a specification by the Interactive Advertising Bureau (IAB) that sets a standard for communication requirements between ad servers and video players. VAST is an XML data structure.

According to VAST, in order to play a video ad in a video player, the video player sends a request to a VAST ad server. The request is a simple HTTP based URL that typically appears as follows: http://www.example.com/?LR_PUBLISHER_ID=1331&LR_CAMPAIGN_ID-229&LR_SC HEMA=vast2-vpaid. The ad server responds with a VAST data structure that declares various parameters: the ad media that should be played; how the ad media should be played; and what should be tracked as the media is played. For example, the above request can return the following response (trimmed):

```
1   <?xml version="1.0" encoding="utf-8"?>
2   <VAST version="2.0">
3     <Ad id="229">
4       <InLine>
5             <AdSystem version="4.9.0-10">LiveRail</AdSystem>
6             <AdTitle><![CDATA[LiveRail creative 1 ]]></AdTitle>
7             <Description><![CDATA[ ]]></Description>
8             <Impression id="LR"><![CDATA
[http://t4.liverail.com/?metric=impression&cofl=0&pos=0&coid=135&pid=1331&nid=1331&oid=229&olid=2
291331&cid=331&tpcid=&vid=&amid=&cc=default&pp=&vv=&tt=&sg=&tsg=&pmu=0&pau=0&psz=0&ctx
=&tctx=&coty=0&adt=0&scen=&url=http%3A%2F%2Fwww.longtailvideo.com%2Fsupport%2Fopen-video-
ads%2F23120%2Fwhat-is-
vast%2F&cb=1259.192.118.68.5.0.690&ver=1&w=&wy=&x=121&y=121&xy=0b79&z2=0]></Impression>
9           ......
10                <Creatives>
11                    <Creative sequence="1" id="331">
12            <Linear>
13              <Duration>00:00:09</Duration>
14            <TrackingEvents>
15          <Tracking event="firstQuartile"><![CDATA
[http://t4.liverail.com/?metric=view25&pos=0&coid=135&pid=1331&nid=1331&oid=229&olid=2291331&cid
=331&tpcid=&vid=&amid=&cc=default&pp=&vv=&tt=&sg=&tsg=&pmu=0&pau=0&psz=0&ctx=&tctx=&co
ty=0&adt=0&scen=&url=http%3A%2F%2Fwww.longtailvideo.com%2Fsupport%2Fopen-video-
ads%2F23120%2Fwhat-is-
vast%2F&cb=1259.192.118.68.5.0.690&ver=1&w=&wy=&x=&y=&xy=]></Tracking>
16          <Tracking event="midpoint"><![CDATA
[http://t4.liverail.com/?metric=view50&pos=0&coid=135&pid=1331&nid=1331&oid=229&olid=2291331&cid
=331&tpcid=&vid=&amid=&cc=default&pp=&vv=&tt=&sg=&tsg=&pmu=0&pau=0&psz=0&ctx=&tctx=&co
ty=0&adt=0&scen=&url=http%3A%2F%2Fwww.longtailvideo.com%2Fsupport%2Fopen-video-
ads%2F23120%2Fwhat-is-
vast%2F&cb=1259.192.118.68.5.0.690&ver=1&w=&wy=&x=&y=&xy=]></Tracking>
17          ......
18          </TrackingEvents>
19          <VideoClicks>
20                <ClickThrough><![CDATA
[http://t4.liverail.com/?metric=clickthru&pos=0&coid=135&pid=1331&nid=1331&oid=229&olid=2291331&ci
d=331&tpcid=&vid=&amid=&cc=default&pp=&vv=&tt=&sg=&tsg=&pmu=0&pau=0&psz=0&ctx=&tctx=&c
oty=0&adt=0&scen=&url=http%3A%2F%2Fwww.longtailvideo.com%2Fsupport%2Fopen-video-
ads%2F23120%2Fwhat-is-
vast%2F&cb=1259.192.118.68.5.0.690&ver=1&w=&wy=&x=&y=&xy=&redirect=http%3A%2F%2Fliverail.c
om%2F]></ClickThrough>
21                </VideoClicks>
22        <MediaFiles>
23                    <MediaFile delivery="progressive" bitrate="256" width="480"
height="352" type="video/x-flv"><![CDATA
[http://cdn.liverail.com/adasset4/1331/229/331/lo.flv]></MediaFile>
24            ......
25                </MediaFiles>
26            ......
27            </Linear>
28        </Creative>
29        </Creatives>
30      </InLine>
31    </Ad>
32  </VAST>
```

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A system comprising:
   one or more processors; and
   a non-transitory machine-readable storage medium containing instructions which when executed on the one or more processors, cause the one or more processors to perform operations including:
   receiving video data from one or more video data sources;
   generating a set of video data points representative of a video program from the video data, wherein each video data point of the set of video data points includes reference data point bits corresponding to pixel information of the video program;
   modifying the set of video data points by:
     deriving binary data for video data points of the set of video data points using one or more projected vectors; and
     discarding the reference data point bits of the video data points;
   receiving from a computing device displaying a video channel, a cue including a representation of pixel data derived from a portion of a video frame of the video channel;
   identifying the video program associated with the cue by matching the cue to a particular video data point of the set of video data points; and
   facilitating a transmission of one or more replacement media segments to the computing device, wherein the one or more replacement media segments are configured to be cached by the computing device until a trigger embedded into the video channel is detected.

2. The system of claim 1, wherein a first video data point is generated by:
   deriving binary data from a portion of the video data representing a first video program; and
   discarding bits of the video data representing the first video program.

3. The system of claim 1, wherein video data points are removed from the set of video data points after a predetermined time interval.

4. The system of claim 1, wherein the trigger is a watermark embedded into one or more video frames of the video channel.

5. The system of claim 1, wherein the trigger is detected by the computing device.

6. The system of claim 1, wherein the operations further include:
   detecting the trigger embedded into one or more video frames of the video channel; and
   transmitting a command to the computing device, wherein executing the command causes the computing device to present a replacement media segment of the one or more replacement media segments in place of a media segment of the video channel.

7. The system of claim 1, wherein the set of video data points is updated continuously.

8. A computer-implemented method comprising:
   receiving video data from one or more video data sources;
   generating a set of video data points representative of a video program from the video data, wherein each video data point of the set of video data points includes reference data point bits corresponding to pixel information of the video program;
   modifying the set of video data points by:
     deriving binary data for video data points of the set of video data points using one or more projected vectors; and
     discarding the reference data point bits of the video data points;

receiving from a computing device displaying a video channel, a cue including a representation of pixel data derived from a portion of a video frame of the video channel;

identifying the video program associated with the cue by matching the cue to a particular video data point of the set of video data points; and facilitating a transmission of one or more replacement media segments to the computing device, wherein the one or more replacement media segments are configured to be cached by the computing device until a trigger embedded into the video channel is detected.

9. The computer-implemented method of claim 8, wherein a first video data point is generated by:

deriving binary data from a portion of the video data representing a first video program; and discarding bits of the video data representing the first video program.

10. The computer-implemented method of claim 8, wherein video data points are removed from the set of video data points after a predetermined time interval.

11. The computer-implemented method of claim 8, wherein the trigger is a watermark embedded into one or more video frames of the video channel.

12. The computer-implemented method of claim 8, wherein the trigger is detected by the computing device.

13. The computer-implemented method of claim 8, further comprising:

detecting the trigger embedded into one or more video frames of the video channel; and transmitting a command to the computing device, wherein executing the command causes the computing device to present a replacement media segment of the one or more replacement media segments in place of a media segment of the video channel.

14. The computer-implemented method of claim 8, wherein the set of video data points is updated continuously.

15. A non-transitory machine-readable storage medium containing instructions which when executed on one or more processors, cause the one or more processors to perform operations including:

receiving video data from one or more video data sources;

generating a set of video data points representative of a video program from the video data, wherein each video data point of the set of video data points includes reference data point bits corresponding to pixel information of the video program;

modifying the set of video data points by:

deriving binary data for video data points of the set of video data points using one or more projected vectors; and discarding the reference data point bits of the video data points;

receiving from a computing device displaying a video channel, a cue including a representation of pixel data derived from a portion of a video frame of the video channel;

identifying the video program associated with the cue by matching the cue to a particular video data point of the set of video data points; and facilitating a transmission of one or more replacement media segments to the computing device, wherein the one or more replacement media segments are configured to be cached by the computing device until a trigger embedded into the video channel is detected.

16. The non-transitory machine-readable storage medium of claim 15, wherein a first video data point is generated by:

deriving binary data from a portion of the video data representing a first video program; and discarding bits of the video data representing the first video program.

17. The non-transitory machine-readable storage medium of claim 15, wherein video data points are removed from the set of video data points after a predetermined time interval.

18. The non-transitory machine-readable storage medium of claim 15, wherein the trigger is a watermark embedded into one or more video frames of the video channel.

19. The non-transitory machine-readable storage medium of claim 15, wherein the trigger is detected by the computing device.

20. The non-transitory machine-readable storage medium of claim 15, wherein the operations further include:

detecting the trigger embedded into one or more video frames of the video channel; and transmitting a command to the computing device, wherein executing the command causes the computing device to present a replacement media segment of the one or more replacement media segments in place of a media segment of the video channel.

\* \* \* \* \*